United States Patent
Fernandez Alonso et al.

(10) Patent No.: US 12,464,577 B2
(45) Date of Patent: Nov. 4, 2025

(54) APPLICATION IDENTIFICATION IN ACCESS TRAFFIC STEERING, SWITCHING, AND SPLITTING (ATSSS) RULES

(71) Applicant: Telefonaktiebolaget LM Ericsson (publ), Stockholm (SE)

(72) Inventors: Susana Fernandez Alonso, Madrid (ES); Fuencisla Garcia Azorero, Madrid (ES); Maria Belen Pancorbo Marcos, Madrid (ES); Stefan Rommer, Västra Frölunda (SE); Veronica Sanchez Vega, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 355 days.

(21) Appl. No.: 17/913,721

(22) PCT Filed: Apr. 8, 2021

(86) PCT No.: PCT/IB2021/052928
§ 371 (c)(1),
(2) Date: Sep. 22, 2022

(87) PCT Pub. No.: WO2021/205381
PCT Pub. Date: Oct. 14, 2021

(65) Prior Publication Data
US 2023/0113519 A1    Apr. 13, 2023

Related U.S. Application Data

(60) Provisional application No. 63/008,090, filed on Apr. 10, 2020.

(51) Int. Cl.
*H04W 76/11*    (2018.01)
*H04W 76/25*    (2018.01)
*H04W 92/24*    (2009.01)

(52) U.S. Cl.
CPC ............ *H04W 76/11* (2018.02); *H04W 76/25* (2018.02); *H04W 92/24* (2013.01)

(58) Field of Classification Search
CPC ...... H04W 76/11; H04W 76/25; H04W 92/24
(Continued)

(56) References Cited

U.S. PATENT DOCUMENTS

2019/0116521 A1*    4/2019    Qiao .................... H04W 28/06
2019/0260811 A1    8/2019    Kim et al.
(Continued)

FOREIGN PATENT DOCUMENTS

| WO | 2019190166 A1 | 10/2019 |
|---|---|---|
| WO | 2019194633 A1 | 10/2019 |
| WO | 2021203794 A1 | 10/2021 |

OTHER PUBLICATIONS

3GPP Standard; Technical Specification; 3GPP TS 23.501, 3rd Generation Partnership Project (3GPP), Mobile Competence Centre ; 650, Route Des Lucioles ; F-06921 Sophia-Antipolis Cedex; France, vol. SA WG2, No. V16.4.0 Mar. 27, 2020 (Mar. 27, 2020), pp. 1-430, XP051861090, (Year: 2020).*
(Continued)

*Primary Examiner* — Khaled M Kassim
*Assistant Examiner* — Oladiran Gideon Olaleye
(74) *Attorney, Agent, or Firm* — Murphy, Bilak & Homiller, PLLC

(57) ABSTRACT

Embodiments include methods for a policy control function (PCF) of a communication network. Such methods include, during establishment of a packet data unit, PDU, session for a user equipment, UE, determining one or more UE application descriptors that correspond to a network application identifier (AppId) of a service data flow (SDF) template for the PDU session. Each UE application descriptor includes a first identifier (OSId) of a UE-supported operating system
(Continued)

(OS) and a second identifier (OSAppId) of an application for the UE-supported OS identified by the first identifier. Such methods include sending policy rules for the PDU session to a session management function (SMF) of the communication network. The policy rules include the UE application descriptors. Other embodiments include complementary methods for an SMF, as well as PCFs and SMFs configured to perform such methods.

19 Claims, 8 Drawing Sheets

(58) Field of Classification Search
USPC .......................................................... 370/329
See application file for complete search history.

(56) References Cited

U.S. PATENT DOCUMENTS

| | | |
|---|---|---|
| 2019/0274178 A1 | 9/2019 | Salkintzis et al. |
| 2019/0357082 A1 | 11/2019 | Kim et al. |
| 2021/0120596 A1* | 4/2021 | Youn ..................... H04W 76/12 |
| 2023/0021830 A1* | 1/2023 | Sun ..................... H04L 65/1046 |

OTHER PUBLICATIONS

"3GPP TS 23.503 V16.4.0", 3rd Generation Partnership Project; Technical Specification Group Services and System Aspects; Policy and charging control framework for the 5G System (5GS); Stage 2 (Release 16), Mar. 2020, pp. 1-115.
"Clarification on applicability of UE policy to PLMNs", SA WG2 Meeting #134, S2-1908005, Sapporo, Janpan, (Revision of S2-1907158), Jun. 24-28, 2019, pp. 1-5.
"PCC and N4 handling of ATSSS", SA WG2 Meeting #129, S2-1810965, Dongguan, P. R. China (revision of S2-1810235), Oct. 15-19, 2018, pp. 1-15.
Jiuhui, Du, et al., "Study on 5G Network Slicing End-to-End Management and Orchestration", Post and Telecommunications Design Technology, Mar. 18, 2018, pp. 1-7, English abstract attached.
"3GPP TS 23.502 V16.4.0", 3rd Generation Partnership Project; Technical Specification Group Services and System Aspects; Procedures for the 5G System (5GS); Stage 2 (Release 16), Mar. 2020, pp. 1-582.
"3GPP TS 23.503 V16.4.1", 3rd Generation Partnership Project; Technical Specification Group Services and System Aspects; Policy and charging control framework for the 5G System (5GS); Stage 2 (Release 16), Apr. 2020, pp. 1-115.
"3GPP TS 29.512 V16.4.0", 3rd Generation Partnership Project; Technical Specification Group Core Network and Terminals; 5G System; Session Management Policy Control Service; Stage 3 (Release 16), Mar. 2020, pp. 1-186.
"3GPP TS 23.203 V16.2.0", 3rd Generation Partnership Project; Technical Specification Group Services and System Aspects; Policy and charging control architecture (Release 16), Dec. 2019, pp. 1-267.
"Providing OSid and OSAppld in the MA PDU Session Control Information", SA WG2 Meeting #S2-138E, S2-2003445, E-meeting, (revision of S2-200xxxx), Apr. 20-24, 2020, pp. 1-13.
"Support of OSID and OSAppID as traffic descriptors based on stage 3 agreements", SA WG2 Meeting #137-e; S2-2002303; Online, Feb. 24-27, 2020, pp. 1-4.
"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.
"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.

* cited by examiner

APPLICATION IDENTIFICATION IN ACCESS TRAFFIC STEERING, SWITCHING, AND SPLITTING (ATSSS) RULES

TECHNICAL FIELD

The present application relates generally to the field of communication networks and more specifically to techniques for determining and/or provisioning policies and/or rules for use of applications in a communication network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to 5G but similar principles can be applied to earlier-generation Long Term Evolution (LTE) networks.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

HSS 131 can communicate with MMEs 134 and 138 via respective S6a interfaces, and with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

In addition, S-GWs 134 and 138 can communicate with a packet gateway (P-GW) 139 via respective S5 interfaces. P-GW 135 provides access to external Packet Data Networks (PDNs), such as PDN 140 shown in FIG. 1. For example, PDN 140 can be the point of entry to (or exit from) EPC 130 of traffic for UE 120. However, if UE 120 has multiple data sessions to multiple PDNs, UE 120 can be connected with multiple P-GWs but it will still be served by only one SGW (e.g., 134 or 138). In some cases, P-GW 135 can also act as an Internet Protocol (IP) router with support for mobile-specific tunneling and signaling protocols. In some deployments, PDN 140 can include an IP Multimedia Subsystem (IMS).

P-GW 135 also communicates with a Policy and Charging Rules Function (PCRF) 138 over an S7 interface. PCRF 138 provides policy control decisions and charging control functionalities for users (e.g., UE 120) operating in the LTE network. PCRF 138 also provides network control of service data flow detection, gating, quality of service (QoS), and flow-based charging (except credit management). PCRF 138 performs these functions (referred to collectively as "policy and charging control" or PCC) together with a Policy Control Enforcement Function (PCEF), which can be part of P-GW 135. For example, PCRF 138 can communicate with the PCEF over the Gx interface as shown in FIG. 1. More generally, these functions are part of a PCC architecture that is defined in 3GPP TS 23.203 (for EPC/LTE).

For example, as a packet data (e.g., IMS) session is being set up, signaling (e.g., SIP signaling) containing media requirements is exchanged between UE 120 and PDN 140. At some time in the session establishment process, PCRF 138 receives those, requirements from the PDN (e.g., an IMS P-CSCF) and makes decisions based on network operator rules. Such decisions can include Allowing or rejecting the media request, using new or existing packet data context for the media request, and checking the allocation of new resources against the maximum authorized for UE 120. PCRF 138 communicates with PDN 140 over an RXi interface.

Users can be charged for services (e.g., packet data sessions) provided by the LTE network by either an online charging system (OCS) or an offline charging system (OFCS), shown collectively in FIG. 1 as OCS/OFCS 150. A primary difference is that online charging can affect provisioning of services to users in real-time, while offline charging is applied after services are rendered and, thus, does not affect real-time provisioning. As in FIG. 1, PCRF 138 communicates with OCS/OFCS 150 via respective Gy/Gz interfaces.

FIG. 2 shows a high-level view of an exemplary 5G network architecture, including a Next Generation Radio Access Network (NG-RAN) 299 and a 5G Core (5GC) 298. As shown in the figure, NG-RAN 299 can include gNBs 210 (e.g., 210a,b) and ng-eNBs 220 (e.g., 220a,b) that are interconnected with each other via respective Xn interfaces. The gNBs and ng-eNBs are also connected via the NG interfaces to 5GC 298, more specifically to the AMF (Access and Mobility Management Function) 230 (e.g., AMFs 230a,b) via respective NG-C interfaces and to the UPF (User Plane Function) 240 (e.g., UPFs 240a,b) via respective NG-U interfaces. Moreover, the AMFs 230a,b can communicate with one or more policy control functions (PCFs, e.g., PCFs 250a,b) and network exposure functions (NEFs, e.g., NEFs 260a,b). The AMFs, UPFs, PCFs, and NEFs are described further below.

Each of the gNBs 210 can support the NR radio interface including frequency division duplexing (FDD), time division duplexing (TDD), or a combination thereof. In contrast, each of ng-eNBs 220 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 211a-b and 221a-b shown as exemplary in FIG. 2. Depending on the particular cell in which it is located, a UE 205 can communicate with the gNB or ng-eNB serving that particular cell via the NR or LTE radio interface, respectively.

In 5G networks (e.g., in 5GC), conventional peer-to-peer interfaces and protocols (e.g., in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services. Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify".

3GPP specifications define an Access Traffic Steering, Switching and Splitting (ATSSS) feature that enables a Multi-Access (MA) Packet Data Unit (PDU) Connectivity Service, in which a UE can exchange PDUs with a data network by simultaneously using one 3GPP access network and one non-3GPP access network. As defined in 3GPP TS 23.501 (v16.4.0) section 5.32.2, a PCF in the 5GC is informed of ATSSS capabilities (e.g., Steering Mode and Steering Functionality) of a UE MA PDU Session by a session management function (SMF) in the 5GC.

The MA PDU Session Control information in the PCC rules is used by the SMF to create ATSSS rules for the UE. The ATSSS rules are sent to UE when the MA PDU Session is created or updated by the SMF/PCF. This is described in more detail in 3GPP TS 23.501 (v16.4.0) and 23.502 (v16.4.0). The ATSSS rules sent by SMF to the UE includes various types of traffic descriptor information. However, certain aspects of the traffic descriptors are not directly available to the SMF, which can create various problems, issues, and/or difficulties.

SUMMARY

Embodiments of the present disclosure provide specific improvements to management of policies and/or rules for use of applications in a communication network, such as by facilitating solutions to overcome exemplary problems summarized above and described in more detail below Exemplary embodiments include methods (e.g., procedures) for a policy control function (PCF) for a communication network (e.g., EPC, 5GC). The PCF can be hosted and/or provided by one or more network nodes in or associated with the communication network.

These exemplary methods can include, during establishment of a PDU session for a UE, determining one or more UE application descriptors that correspond to a network application identifier (AppId) of a service data flow (SDF) template for the PDU session. Each UE application descriptor includes a first identifier (OSId) of a UE-supported operating system (OS), and a second identifier (OSAppId) of an application for the UE-supported OS identified by the first identifier. These exemplary methods can also include sending policy rules for the PDU session to a session management function (SMF) of the communication network. The policy rules include the UE application descriptors.

In some embodiments, these exemplary methods can also include receiving, from the SMF, a request for the policy rules for the PDU session. In such embodiments, the request can include the SDF template, including the network application identifier (AppId). The policy rules can be sent in response to the request. In some embodiments, the request also includes an indication that the requested policy rules are for a multi-access (MA) PDU session and the policy rules include Access Traffic Steering, Switching, and Splitting (ATSSS) information.

In some embodiments, these exemplary methods can also include determining identifiers of one or more UE-supported OS during registration of the UE in the communication network, and storing the determined identifiers in a user data repository (UDR) of the communication network.

In some of these embodiments, determining the identifiers can include one of the following: receiving the identifiers from the UE, or deriving the identifiers based on a permanent equipment identifier (PEI), of the UE, that was obtained from an access and mobility management function (AMF) of the communication network.

In some embodiments, determining the UE application descriptors can include various operations, including: mapping the network application identifier to one or more OS identifiers and corresponding one or more OS-specific application identifiers; obtaining identifiers of one or more UE-supported OS; selecting, as the first identifiers, the mapped OS identifiers that match the obtained identifiers of UE-supported OS; and selecting, as the second identifiers, the mapped OS-specific application identifiers that correspond to the selected first identifiers.

In some of these embodiments, the obtaining the identifiers can be further represented by various sub-operations including: retrieving the identifiers of the one or more UE-supported OS from a user data repository (UDR) of the communication network; when the identifiers are unavailable from the UDR, determining the identifiers based on a permanent equipment identifier (PEI) of the UE obtained from the SMF; and when the identifiers cannot be determined based on the PEI, selecting identifiers of OS that are commonly supported by UEs operating in the communication network.

In some of these embodiments, these exemplary method can also include the additional operations of: locally storing the identifiers of the one or more UE-supported OS retrieved from the UDR; subsequently receiving, from the SMF, a request for updated policy rules for the PDU session, wherein the request includes an updated network application identifier; determining one or more updated UE application descriptors based on the updated network application identifier and the locally stored identifiers; and sending, to the SMF, updated policy rules including the updated UE application identifiers.

In certain embodiments, the UE application descriptions (e.g., included in the policy rules sent) can exclude respective versions of the identified UE-supported OS and respective versions of the identified applications.

Other embodiments include methods (e.g., procedures) for a session management function (SMF) for a communication network (e.g., 5GC). The SMF can be hosted and/or provided by one or more network nodes in or associated with the communication network.

These exemplary methods can include sending, to a PCF of the communication network, a second request for policy rules for a PDU session for a UE. The second request includes a service data flow (SDF) template that includes a network application identifier (AppId) associated with the PDU session. These exemplary methods can include receiving policy rules for the PDU session from the PCF. The policy rules can include one or more UE application descriptors that correspond to the network application identifier. Each UE application descriptor includes a first identifier (OSId) of a UE-supported operating system (OS) and a second identifier (OSAppId) of an application for the UE-supported OS identified by the first identifier. These exemplary methods can also include sending, to the UE, PDU session rules that include the one or more UE application descriptors. In some embodiments, the PDU session rules are for Access Traffic Steering, Switching, and Splitting (ATSSS).

In some embodiments the UE application descriptions (e.g., included in the policy rules received) can exclude respective versions of the identified UE-supported OS and respective versions of the identified applications.

In some embodiments, these exemplary methods can also include receiving a first request to establish the PDU session for the UE. The first request includes an indication that the requested PDU session is a multi-access (MA) PDU session. In such embodiments, the second request includes an indication that the policy rules are for a MA PDU session.

In some embodiments, these exemplary methods can also include: sending, to the PCF, a third request for updated policy rules for the PDU session, wherein the third request includes an updated network application identifier; and receiving, from the PCF, updated policy rules including one or more updated UE application identifiers that correspond to the updated network application identifier.

Other embodiments also include PCFs and SMFs that are configured to perform operations (e.g., using processing circuitry) corresponding to any of the exemplary methods described herein. Other embodiments also include non-transitory, computer-readable media storing computer-executable instructions that, when executed by processing circuitry associated with such PCFs and SMFs, configure the same to perform operations corresponding to any of the exemplary methods described herein.

These and other described embodiments facilitate a single configuration point in the network for application descriptor (e.g., OSId+OSAppId) information related to a UE. For example, AppId to OSAppId mapping is centralized in the PCF. Another benefit is that the application descriptors included in the ATSSS rules delivered to the UE match the OS(s) requirements of the UE, such that the UE is neither under- nor over-provisioned.

These and other objects, features, and advantages of embodiments of the present disclosure will become apparent upon reading the following Detailed Description in view of the Drawings briefly described below.

DETAILED DESCRIPTION

Figure 1:
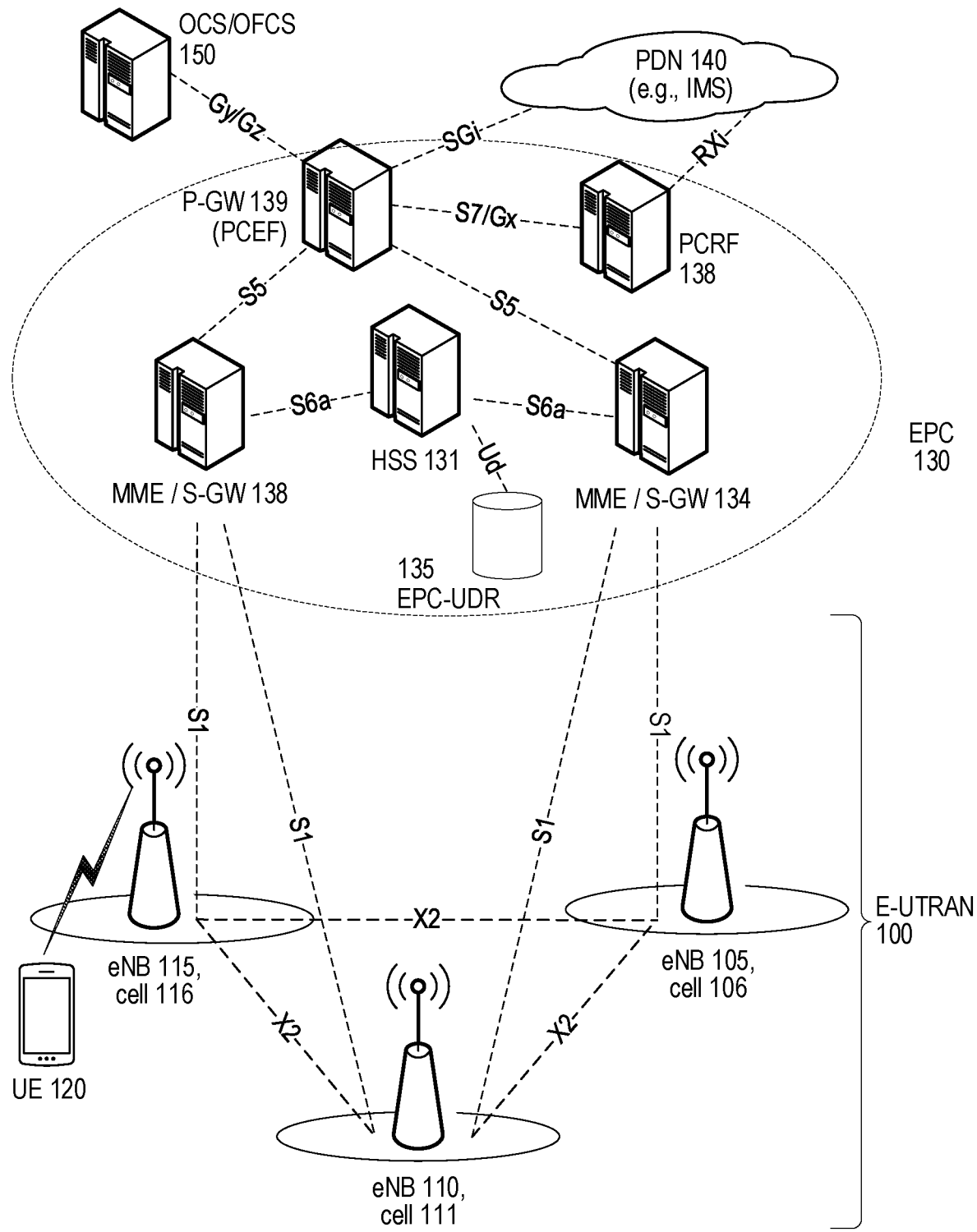
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
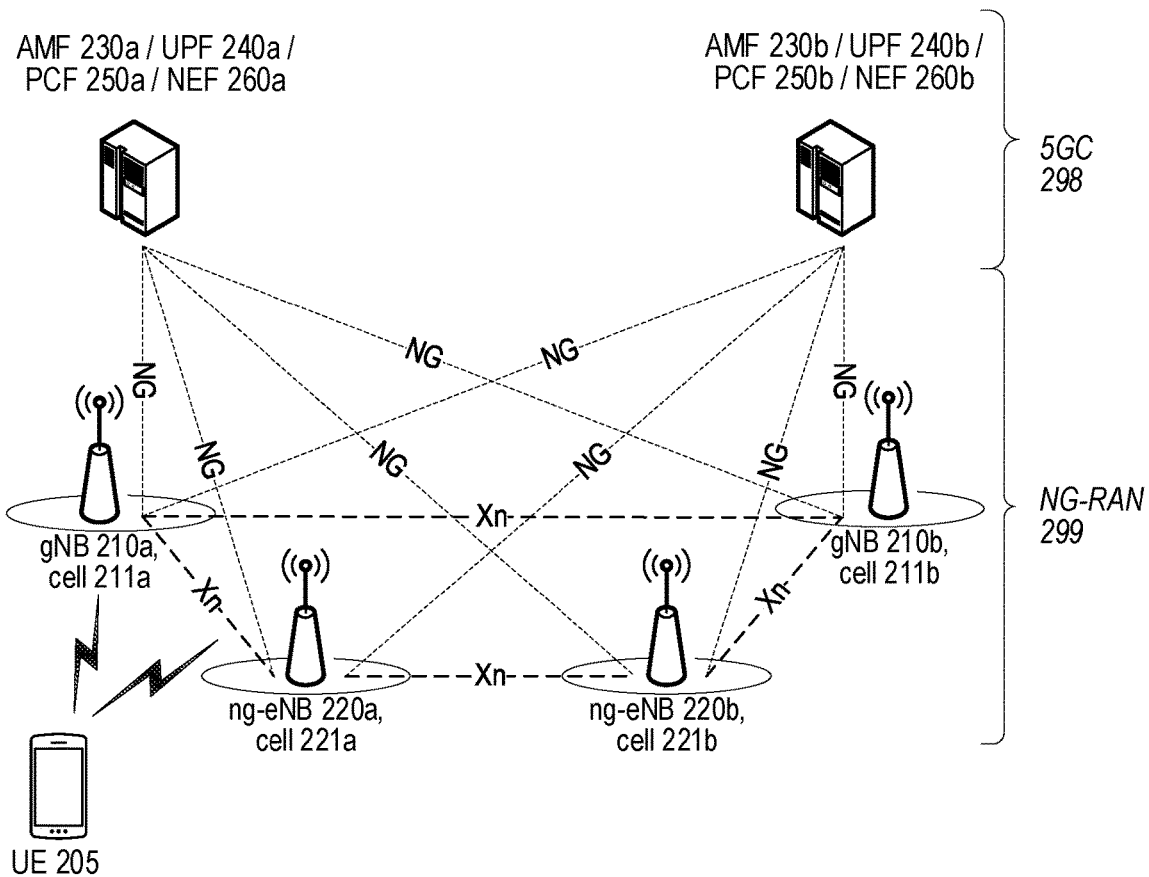
FIG. 2 illustrate an exemplary high-level view of a 5G network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system.

In the present disclosure, the term "service" is used generally to refer to a set of data, associated with one or more applications, that is to be transferred via a network with certain specific delivery requirements that need to be fulfilled in order to make the applications successful. In the present disclosure, the term "component" is used generally to refer to any component needed for the delivery of the service. Examples of components are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation and storage. In general, each component can have a "manager", a term used generally to refer to an entity that can collect historical information about utilization of resources as well as provide information about the current and the predicted future availability of resources associated with that component (e.g., a RAN manager).

As briefly mentioned above, Access Traffic Steering, Switching and Splitting (ATSSS) rules for a Multi-Access (MA) PDU session that are sent by an SMF to a UE can include various types of traffic descriptor information. However, certain aspects of the traffic descriptors are not directly available to the SMF, which can create various problems, issues, and/or difficulties. This discussed in more detail below after the following description of 5G network architecture.

Figure 3:
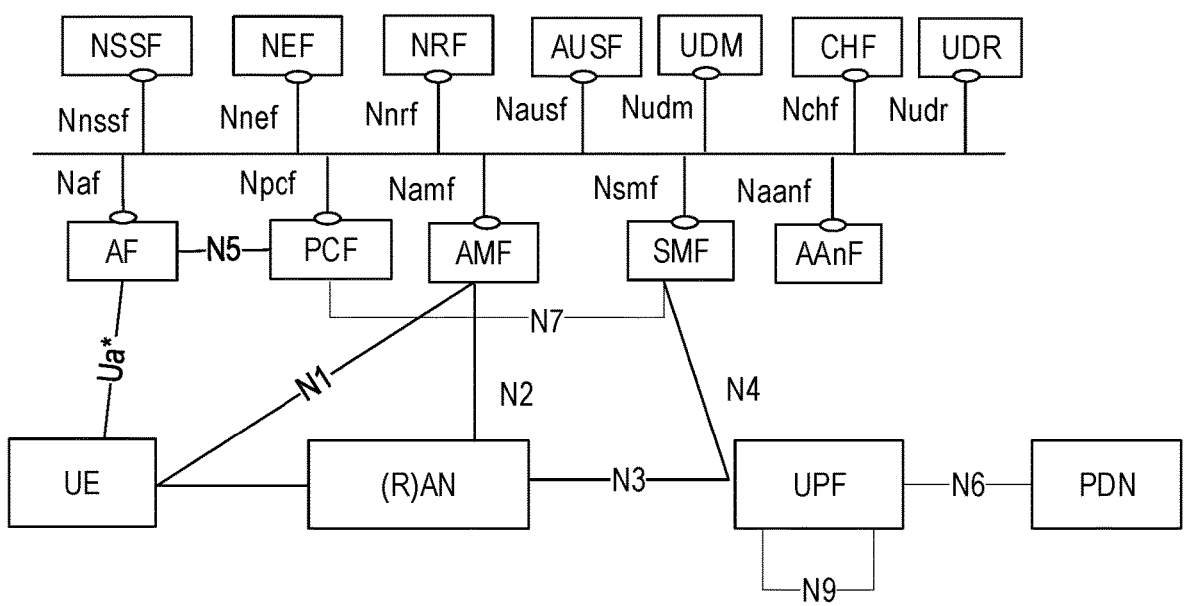
FIG. 3 shows an exemplary non-roaming 5G reference architecture with service-based interfaces and various network functions (NFs) in a core network, as further described in 3GPP TS 23.501 (v16.1.0).

FIG. 3 shows an exemplary non-roaming 5G reference architecture with service-based interfaces and various 3GPP-defined network functions (NFs) within the control plane (CP). These include:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. In addition, PCF provides Access Network Discovery and Selection Policy (ANDSP), UE Route Selection Policy (URSP), and Vehicle-to-Everything Policy (V2XP) to the UE via the AMF (N15 interface). Similar to LTE PCRF, PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF) with Nupf interface—supports handling of user plane traffic based on the rules received from SMF, including packet inspection and different enforcement actions (e.g., event detection and reporting).

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and IS involved in registration management, connection management, reachability management, and mobility management of UEs (similar to MME in EPC). AMF also forwards UE policies from PCF to served UE and reports UE states to the PCF.

Network Exposure Function (NEF) with Nnef interface—acts as the entry point into operator's network, by securely exposing to AFs the network capabilities and events provided by 3GPP NFs and by providing ways for the AF to securely provide information to 3GPP network.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the network resources (e.g., compute, storage, communication) that provide the capabilities and characteristics of the network slice. NSSF enables other NFs (e.g., AMF) to identify a network slice instance that is appropriate for a UE's desired service.

Authentication Server Function (AUSF) with Nausf interface—based in a user's home network (HPLMN), it performs user authentication and derives security key materials.

The Unified Data Management (UDM) function shown in FIG. 3 is similar to the HSS in LTE/EPC networks discussed above. UDM supports Generation of 3GPP authentication credentials, user identification handling, access authorization based on subscription data, and other subscriber-related functions. To provide this functionality, the UDM uses subscription data (including authentication data) stored in the 5GC unified data repository (UDR) shown in FIG. 3. The UDR (which has an Nudr interface) supports storage and retrieval of policy data by the PCF, as well as storage and retrieval of application data by NEF. Application data can also be placed into the UDR by the external AFs, via the Network Exposure Function (NEF), in order to be made available to whichever 5G NFs need—and are authorized to request—subscriber-related information.

PCF control of ATSSS for a detected service data flow (SDF) is enabled by including Multi-Access PDU (MA PDU) Session Control information in the relevant PCC rule. This allows the PCF to control the following capabilities:

Steering Mode that is used to steer/switch/split the detected Service Data Flow (SDF), i.e., rule for distributing the traffic between accesses;

Steering Functionality that is used for the detected SDF, i.e., method for sending traffic matching the SDF template over the MA PDU session;

Charging information depending on what Access Type is used for a detected SDF; and Usage Monitoring information depending on Access Type used for a detected SDF.

Other information in the PCC Rule applies to the SDF itself and is generally independent of Access Type used for a packet. The MA PDU Session Control information in the PCC rules is used by the SMF to create ATSSS rules for the UE. The ATSSS rules are sent to UE when the MA PDU Session is created or updated by the SMF/PCF. This is described in more detail in 3GPP TS 23.501 and 23.502.

According to 3GPP TS 23.503, the traffic to be split/switched/steered is identified by the SDF template in the PCC rule. The SDF template is identified by either a list of SDF filters or an application identifier (AppId) that references the corresponding application detection filter for the detection of the service data flow.

According to 3GPP TS 23.501, clause 5.32.8, an ATSSS rule sent to the UE includes traffic descriptor information that can include at least one of the following descriptors:

one or more application descriptors (identifying the traffic generating the traffic), IP descriptors (5-tuples that identify the destination of the Internet Protocol traffic) or Non-IP descriptors (descriptors that identify the destination of Ethernet traffic).

It is further specified that an application descriptor includes the following information:

Operating System Identifier (OSId): An identifier of an operating system (OS); and OS specific Application Identifier (OSAppId): An identifier associated with a particular application and uniquely identifying the application within the UE for a particular operating system.

The UE may check received OSId(s) to determine if this information that matches OS(s) installed in the UE. However, it is not specified how the SMF obtains the OSId and OSAppId to be provided as part of traffic descriptor information in the ATSSS rule. Also, note that the OSAppId is different than an AppId that may be included in the SDF template of the PCC rule. While OSAppId is intended to be used by the UE, AppId is intended to be used by the network. The policy information provided from the PCF to the UE can include the following policies:

Access Network Discovery & Selection Policy (ANDSP), used by the UE for selecting non-3GPP accesses network;

UE Route Selection Policy (URSP), used by the UE to determine how to route outgoing traffic (e.g., via an established PDU Session, offloaded to non-3GPP access outside a PDU Session, or triggering establishment of a new PDU Session); and V2X Policy (V2XP), including configuration parameters to the UE for V2X communication.

When the PCF determines to send the UE any of these policies that contain an application descriptor it will check if the OSId(s) of the UE is known. To determine the operating system of the UE, the PCF may use a Permanent Equipment Identifier (PEI) for the UE that is provided by the AMF and/or an OSId provided by the UE. These parameters can be received from the UE in the UE Policy Container (e.g., OSId(s)) from the AMF in the Npcf_UEPolicyControl_Create response message. If the PEI or the OSId is available to the PCF, the PCF stores them in the UDR using Nudr_DM_Create including DataSet "Policy Data" and Data Subset "UE context policy control data".

If the PCF determines the operating system of the UE and if the PCF should deliver UE policies that contain application descriptors, then the Traffic Descriptors of such UE Policies include the OSAppID associated with the operating system determined by the PCF for the UE. On the other hand, if the PCF is unable to determine the UE operating system, and if the PCF should deliver UE Policies that contain application descriptors, then the Traffic Descriptors include multiple OSAppIDs, each associated with different UE operating systems supported by the network operator implementation.

The PCF selects the ANDSP, URSP and V2X policies applicable for each UE based on local configuration and operator policies. UE policies are provided from the PCF to the AMF via N15/Namf interface and then from AMF to the UE via the N1 interface as described in 3GPP TS 23.502 clause 4.2.4.3. The AMF shall not change the information provided by PCF.

The SMF will include the OSId and OSAppId as part of the ATSSS rule provided to the UE when the traffic descriptor refers to an Application descriptor. However, OSId and OSAppId are not available at the SMF. Instead the SMF will get an AppId configured in the PCF that is provided as part of the SDF Template in the PCC rule. This AppId provided as part of the SDF template is a reference to a corresponding application detection filter for the detection of the service data flow.

In order to provide the required information to the UE, SMFs deployed in the network would be required to have mapping tables between the AppId included in the PCC Rules SDF template and the OSId and OSAppId. Since the UE can handle different Operating Systems, this mapping relation could be one-to-many. This is inefficient as it requires configuration information in both PCF and SMF, i.e., the PCF needs to configure the AppId value and the SMF needs to configure the AppId to one or more OSAppId values. In addition, configured mapping tables in all deployed SMFs with ATSSS capabilities kept up-to-date with information about the mapping relation between AppId and OSAppId.

In addition, if the OSId for the UE is unclear or ambiguous, current solutions require the SMF to provide ATSSS rules with one or more application descriptors, each with one possible OSAppId that corresponds to an AppId. Based on this information, the UE must resolve the supported application identifier for its supported OS among all the received OSAppIds. This procedure can be inefficient and/or demanding in terms of processing requirements on the UE and various NFs, particularly SMF.

Accordingly, embodiments of the present disclosure provide techniques that facilitate a single configuration point in the network for the OSId+OSAppId information related to a UE. In addition, embodiments facilitate a PCF, selected for handling SM Policy Context association, to obtain accurate OSId+OSAppId for a registered UE from a common storage point, thereby avoiding over-provisioning the UE with ATSSS rule information that will never be invoked by the UE. In other words, the application descriptors included in the ATSSS rules delivered to the UE match the OS(s) requirements of the UE. In addition, embodiments remove requirements for SMFs with ATSSS capabilities to keep updated configuration mapping tables with relations between AppIds in SDF templates and corresponding OSId(s)/OSAppId(s). In other words, AppId to OSAppId mapping is centralized in the PCF.

Various embodiments enable the PCF to provide OSId and OSAppId information as part of the PCC Rule following a high-level procedure described as follows. As per current procedures, during the UE registration, the PCF checks if OSId(s) are provided by the UE. If not, the PCF checks if the Permanent Equipment Identifier (PEI) is available as a basis for deriving OSId. If OSId is obtained from the UE or from the PEI, PCF stores it in the UDR using the Nudr_DM_Create including the DataSet "Policy Data" and Data Subset "UE context policy control data".

During the PDU Session Establishment and if ATSSS feature is supported, the PCF will check whether PCC Rules including ATSSS policy should be provided (e.g., as defined in 3GPP TS 29.512, clause 4.2.2.17). If so and if a corresponding traffic descriptor refers to an application descriptor, in addition to the current procedures for the PCC Rule derivation, the PCF performs various operations as part of the PCC Rule derivation. First, the PCF retrieves the list of OSIds associated with the UE from the UDR by using the Nudr_DM_Query including the DataSet "Policy Data" and Data Subset "UE context policy control data". Second, for the retrieved OSIds, the PCF obtains the configured OSAppIds that correspond to the AppId included in the SDF template, and the PCF includes the list of OSId+OSAppId within the PCC Rule being derived.

On the other hand, if the list of OSIds is not available in the UDR and the PCF cannot derive the OSId from the PEI, the PCF may include within the PCC rule the configured information about the available OSId(s)/OSAppId(s) that corresponds to the AppId included in the SDF template. When the SMF receives the PCC rules related to ATSSS policy from the PCF, it will derive the ATSSS Rules based on the OSId+OsAppId obtained directly from the PCC Rule. The SMF will send to the UE, as part of the ATSSS rules, all the combinations received in the PCC Rule.

The following explanation also illustrates high-level operation of various embodiments. A PCF can store the OSAppId associated with an OSId in the UDR at UE Registration. In addition, using Npcf_SMPolicyControl_Create operation, the PCF can obtain a configured list of OSId+AppId related to that UE as well as the OSId(s) related to that UE. However, if the information is not available in the UDR in response to a Npcf_SMPolicyControl_Create operation, the PCF can derive the necessary OSId from the PEI provided by the SMF and obtain the OSAppId related to that OSId. Furthermore, based on operator policies, the PCF can decide to send the configured list of OSId and OSAppId for that UE instead of the information retrieved from the UDR. The PCF can include the OSId and OSAppId in the PCC Rule as part of the MA PDU Session Control information. In addition, the SMF can include the application descriptor information in the PCC rule, received from the PCF, in the ATSSS rule sent to the UE.

Figure 4:
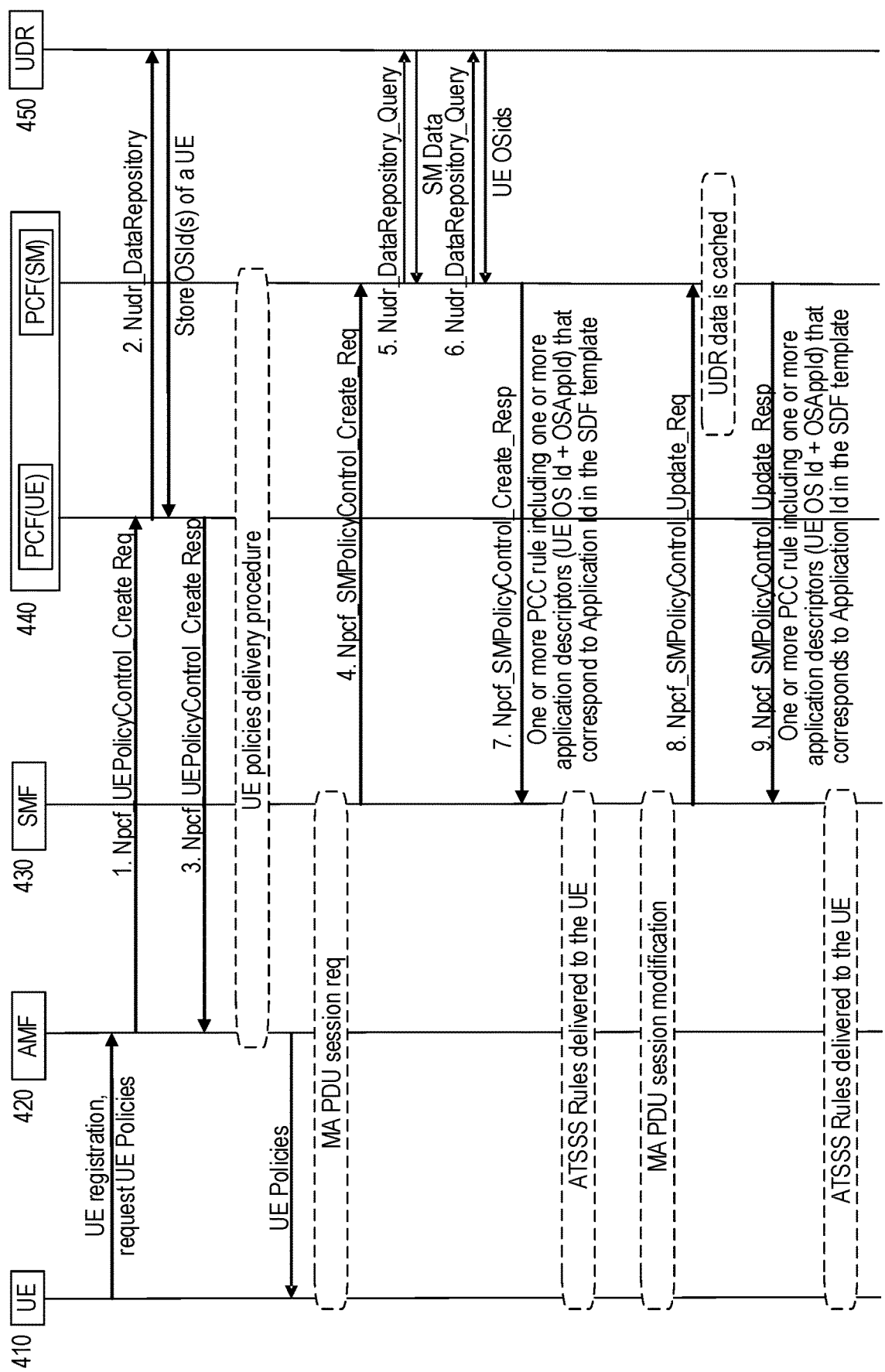
FIG. 4 shows a flow diagram of an exemplary procedure for policy control in a 5GC, according to various exemplary embodiments of the present disclosure.

FIG. 4 is a flow diagram of an exemplary procedure for ATSS policy control in a 5GC, according to various exemplary embodiments of the present disclosure. The exemplary procedure involves various operations by, and interactions between, a UE 410, an AMF 420, an SMF 430, a PCF(UE) 440 (which includes PCF(UE) and PCF(SM) parts), and a UDR 450. For brevity, these devices, nodes, or functions will be referred to without their reference numbers in the following description. Although FIG. 4 shows numbered operations, the numbers are intended to facilitate description and neither require nor imply a particular order of the operations. In other words, the operations shown in FIG. 4 can be performed in a different order than shown and can be combined and/or divided into operations different than the ones shown.

In operation 1, the AMF, at UE registration, invokes the Npcf_UEPolicy-Control_Create request and includes in the request the PEI and UEPolicyRequest container delivered by the UE. The UEPolicyRequest container may include the UE OSId(s).

In operation 2, the PCF(UE) interacts with the UDR via Nudr_DataRepository to retrieve the UE Policy Set information, which can include the UE OSId(s). The PCF uses this retrieved information to derive UE Policies to deliver to the UE. The PCF can base the determination of application information included in the derived UE Policies on the following information:
  The retrieved UE OSId(s), so that only the OSId+OSAppId information related to the UE OSId is included in the application descriptor;
  If the UE OSId(s) are not available, the received PEI, so that only the OSId+OSAppId information related to the OSId derived from the PEI is included in the application descriptor; and
  If the UE OSId(s) are not available and no OSId can be derived from the PEI, the PCF configured information about well-known OSId+AppId for the network deployment (e.g., according to operator policies).
In case the PCF retrieves OSId(s) in operation 1, the PCF can also store the retrieved UE OSId(s) in the UDR in the UP Policy Set.

In operation 3, the PCF responds to the AMF's request in operation 1 with the Npcf_UEPolicyControl_Create Response operation. Subsequently, an end-to-end procedure for UE policies delivery to the UE takes place, as illustrated by the dashed box and followed by the final delivery of UE policies by AMF to UE. After the UE requests the establishment of a MA PDU session (shown in dashed box after policy delivery), in operation 4 the SMF sends a Npcf_SMPolicyControl_Create Request message to the PCF, including the indication that the PDU session is for a MA PDU session. In operation 5, the PCF fetches Session Management (SM) data from the UDR using a Nudr_DataRepository_Query, and in combination with internal policies, determines the PCC rules to deliver to the UE.

In operation 6, when the derived PCC rules include ATSSS information, and the SDF Template of the PCC rules includes an AppId, the PCF performs the following operations to provide the SMF with an application descriptor to include in the ATSSS rule. First, the PCF retrieves the mapping of the AppId into the one or more OSId+OSAppId combinations from internal configuration. Based on operator policies, the PCF invokes Nudr_DataRepository_Query request to retrieve from the UE Policy Set the UE OSId(s) stored at the UDR in operation 2. Next, if the UE OSId information is available from the UDR, the PCF includes in the PCC rule the OSId+OSAppId pairs that match the retrieved UE OSId(s). Alternately, if the UE OSId information is not available from the UDR, the PCF can derive the OSId(s) from the PEI, and include in the PCC rule the OSId+OSAppId pairs that match the derived UE OSId(s). However, if the UE OSId cannot be retrieved or derived from PEI, or if required by operator policies, the PCF includes in the PCC rule the list of OSId+OSAppId pairs retrieved in operation 2 with respect to UE policies.

In operation 7, the PCF sends a Npcf_SMPolicyControl_Create response to the SMF including ATSSS information in the corresponding PCC rules. For the PCC rules that include an AppId in the SDF template, the PCC rule also includes the corresponding application descriptors (OSId+OSAppId). Subsequently, the PCC ATSSS rules are delivered to the UE for use during an MA PDU session.

A PCC rule update can be required, e.g., due to a MA PDU session modification (shown as dashed box). In operation 8, the SMF send an NPCF_SMPolicyControl_Update_Request to the PCF(SM), which has cached or stored information previously retrieved from UDR. The PCF(SM) then derives new/modified PCC rules with ATSSS information that include application descriptions, if required. These can be derived in the same manner as discussed above in relation to operation 6. In operation 9, the PCF delivers the updated PCC rules to SMF via a NPCF_SMPolicyControl_Update_Response, and the updated PCC ATSSS rules are delivered to the UE in the same manner as discussed above.

Although FIG. 4 shows an exemplary procedure involving a 5GC, similar principles can be employed for EPC ATSSS policy control procedures. For example, the signal flow shown in FIG. 4 can also be applied to EPC with PCF replaced by PCRF, AMF replaced by MME, SMF replaced PCEF (or by PGW-C when Control Plane and User Plane are split), UDR replaced by EPC-UDR, etc. FIG. 1 shows an exemplary arrangement of such elements.

Aspects of the techniques described herein can also be embodied in the text of a 3GPP specification. The following exemplary text for 3GPP TS 23.502 (Rel-16) relates to certain aspects of various embodiments described above.
*Begin Proposed Text for 3GPP TS 23.502*
6.1.3.20 Access Traffic Steering, Switching and Splitting
As specified in TS 23.501 [2], the Access Traffic Steering, Switching and Splitting (ATSSS) feature is an optional feature that may be supported by the UE and the 5GC network. The ATSSS feature enables a multi-access PDU Connectivity Service, which can exchange PDUs between the UE and a data network by simultaneously using one 3GPP access network and one non-3GPP access network. The PCF is informed of the ATSSS capabilities of a MA PDU Session by the SMF, as defined in TS 23.501 [2] clause 5.32.2. The ATSSS capabilities are both the Steering Mode and the Steering Functionality.
The PCF control of Access Traffic Steering, Switching and Splitting for a detected service data flow (SDF) is enabled by including Multi-Access PDU (MA PDU) Session Control information in the PCC rule. This allows the PCF to control:
  The Steering Mode that is used to steer/switch/split the detected SDF. The available Steering Modes are defined in TS 23.501 [2].
  The Steering Functionality that is used for the detected SDF, e.g. the MPTCP functionality or the ATSSS-LL functionality defined in TS 23.501 [2].
  Charging information depending on what Access Type is used for a detected SDF.

Usage Monitoring information depending on what Access Type is used for a detected SDF.

The rest of the information in the PCC Rule apply to the SDF as such and are not dependent on what Access Type is used for a packet.

The MA PDU Session Control information in the PCC rules is used by the SMF in order to create applicable N4 rules for the UPF and ATSSS rules for the UE, as described in TS 23.501 [2]. The ATSSS rules are sent to UE via NAS when the MA PDU Session is created or updated by the SMF/PCF, as described in TS 23.501 [2] and TS 23.502 [3].

When MA PDU Session Control Information is provided to the SMF within a PCC Rule, the (H-) PCF provides both the Service Data Flow template to identify a Service Data Flow in the UPF and if the Service Data Flow template includes an application identifier, then the OSAppId(s) and associated OSId to identify the application traffic in the UE is also included.

The (H-)PCF may use the OSid stored in the UDR as DataSet "Policy Data" and Data Subset "UE context policy control data" to determine the OSAppId(s) supported by the OSid. If no OSid is available in the UDR; the (H-)PCF may use the PEI to determine the OSid supported by the UE.

If the (H-)PCF does not determine the OSId supported by the UE, the (H-)PCF may provide multiple instances of each OSAppId, each OSAppId is associated to the supported OSId according to operator policies in the (H-)PCF.

The (H-)SMF includes the OSId and OSAppId(s) received from the PCF as part of the MA PDU Session information in the PCC Rule within the Traffic Descriptors in the ATSSS rule. The (H-) SMF includes the SDF templates in the ATSSS Rule as Traffic Descriptors if the OSId(s) and OSAppId(s) are not provided in the MA PDU Session Control Information within the PCC Rule. The PCF may also provide URSP rules to the UE for instructing the UE to establish a MA PDU Session, as described in clause 6.6.2. The PCF control of PDU session level Usage Monitoring depending on what access type is used to carry the traffic is enabled by providing Usage Monitoring control related information per access in the PDU Session related policy control information (as described in clause 6.4).

If the MA PDU session is capable of MPTCP and ATSSS-LL with any Steering Mode in the downlink and MPTCP and ATSSS-LL with Active-Standby in the uplink, then the PCF shall provide a PCC Rule for non-MPTCP traffic. This PCC Rule contains a "match all" SDF template, the lowest precedence, the Steering Functionality set to "ATSSS-LL" and the Steering Mode set to "Active-Standby" for the uplink direction, and the Steering Functionality set to "ATSSS-LL" and the Steering Mode set to any supported steering mode for the downlink direction.

If the MA PDU session is capable of MPTCP and ATSSS-LL with Active-Standby in the uplink and downlink, then the PCF shall provide a PCC Rule for non-MPTCP traffic. This PCC Rule contains a "match all" SDF template, the lowest precedence, the Steering Functionality set to "ATSSS-LL" and the Steering Mode set to "Active-Standby" for the uplink direction and the downlink direction.

These PCC Rules are used by the SMF to generate an ATSSS rule for the UE and an N4 rule for the UPF to route the non-MPTCP traffic of the MA PDU Session in the uplink and downlink direction respectively.

NOTE: The PCF can also use the ATSSS capability of the MA PDU Session to provide PCC Rules containing SDF template for some specific non-MPTCP traffic other than the PCC Rule containing a "match all" SDF template. This allows the operator to apply different policies e.g. charging key to non-MPTCP traffic other than the non-MPCTP traffic matching the "match all" PCC Rule.

*End Proposed Text for 3GPP TS 23.502*

In conjunction with the above description, the following exemplary entry can be added to Table 6.3.1 in section 6.3.1 of 3GPP TS 23.502, along with the subsequent exemplary description.

*Begin Proposed Text for 3GPP TS 23.502*

| Information name | Description | Category | PCF permitted to modify for a dynamic PCC rule in the SMF | Differences compared with table 6.3 in TS 23.203 [4] |
|---|---|---|---|---|
| Application descriptors | Each Application descriptor consists of OSId and OSAppId. (NOTE x) | Conditional (NOTE 21) | Yes | New |

NOTE x:
The OSId does not include an OS version number. The OSAppId does not include a version number for the application.

The Application descriptors provides one or several instances of the OSId and OSAppId combination. It is used by the UE to identify the application traffic to apply the Steering Functionality and the Steering mode.

*End Proposed Text for 3GPP TS 23.502*

The embodiments described above can be further illustrated by the exemplary methods (e.g., procedures) shown in FIGS. 5-6, described below. For example, features of various embodiments discussed above are included in various operations of the exemplary methods shown in FIGS. 5-6. Although these exemplary methods are illustrated by specific blocks in particular orders, the operations corresponding to the blocks can be performed in different orders than shown and can be combined and/or divided into blocks and/or operations having different functionality than shown. The exemplary methods shown in FIGS. 5-6 can be used cooperatively (e.g., with each other and/or with other exemplary methods, such as shown in FIG. 4) to provide benefits, advantages, and/or solutions to problems described herein. Optional blocks and/or operations are indicated by dashed lines.

Figure 5:
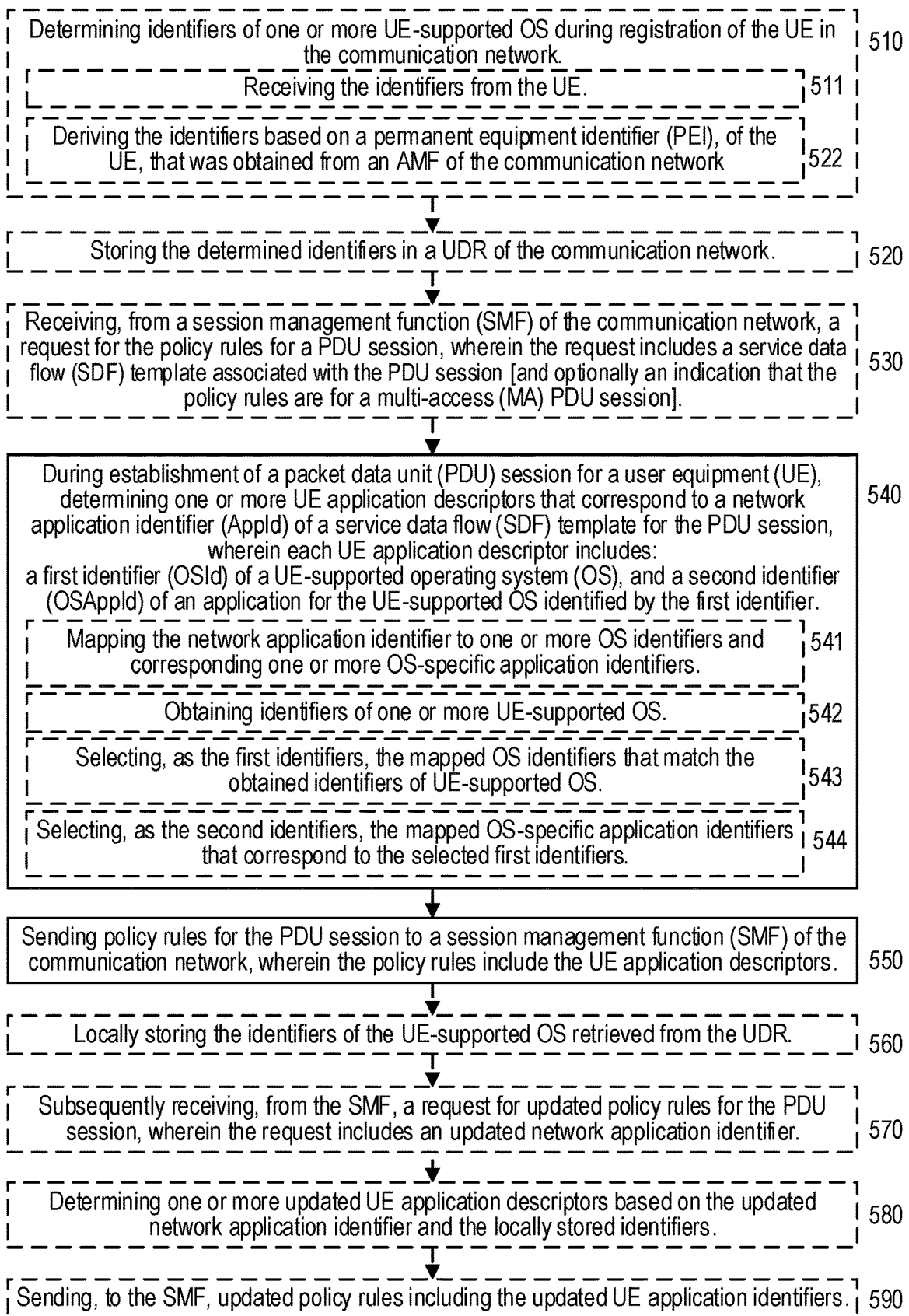
FIG. 5 illustrates an exemplary method (e.g., procedures) for a policy control function (PCF) of a communication network (e.g., 5GC, EPC), according to various exemplary embodiments of the present disclosure.

In particular, FIG. 5 illustrates an exemplary method (e.g., procedure) for a policy control function (PCF) of a communication network (e.g., 5GC), according to various exemplary embodiments of the present disclosure. The PCF can be hosted and/or provided by one or more network nodes in or associated with the communication network, such as described elsewhere herein.

The exemplary method can include the operations of block 540, in which the PCF can, during establishment of a PDU session for a UE, determine one or more UE application descriptors that correspond to a network application identifier (AppId) of a service data flow (SDF) template for the PDU session. Each UE application descriptor includes a first identifier (OSId) of a UE-supported operating system (OS), and a second identifier (OSAppId) of an application for the UE-supported OS identified by the first identifier. The exemplary method can also include the operations of block 550, in which the PCF can send policy rules for the PDU session to a session management function (SMF) of the communication network. The policy rules include the UE application descriptors.

In some embodiments, the exemplary method can also include the operations of block 530, in which the PCF can receive, from the SMF, a request for the policy rules for the PDU session. In such embodiments, the request can include the SDF template, including the network application identifier (AppId). The policy rules can be sent (e.g., in block 540) in response to the request. In some embodiments, the request also includes an indication that the requested policy rules are for a multi-access (MA) PDU session and the policy rules (e.g., sent in block 550) include Access Traffic Steering, Switching, and Splitting (ATSSS) information.

In some embodiments, the exemplary method can also include the operations of blocks 510-520. In block 510, the PCF can determine identifiers of one or more UE-supported OS during registration of the UE in the communication network. In block 520, the PCF can store the determined identifiers in a user data repository (UDR) of the communication network.

In some of these embodiments, determining the identifiers in block 510 can include the operations of either sub-block 511 or sub-block 512. In sub-block 511, the PCF can receive the identifiers from the UE. In sub-block 512, the PCF can derive the identifiers based on a permanent equipment identifier (PEI), of the UE, that was obtained from an access and mobility management function (AMF) of the communication network.

In some embodiments, determining the UE application descriptors in block 540 can include the operations of sub-blocks 541-545. In sub-block 541, the PCF can map the network application identifier to one or more OS identifiers and corresponding one or more OS-specific application identifiers. In sub-block 542, the PCF can obtain identifiers of one or more UE-supported OS. In sub-block 543, the PCF can select, as the first identifiers, the mapped OS identifiers that match the obtained identifiers of UE-supported OS. In sub-block 544, the PCF can select, as the second identifiers, the mapped OS-specific application identifiers that correspond to the selected first identifiers.

In some of these embodiments, the obtaining operations of sub-block 542 can be further represented by sub-operations 542*a-c*. In 542*a*, the PCF can retrieve the identifiers of the one or more UE-supported OS from a user data repository (UDR) of the communication network. In 542*b*, the PCF can, when the identifiers are unavailable from the UDR, determine the identifiers based on a permanent equipment identifier (PEI) of the UE obtained from the SMF. In 542*c*, the PCF can, when the identifiers cannot be determined based on the PEI, select identifiers of OS that are commonly supported by UEs operating in the communication network.

In some of these embodiments, the exemplary method can also include the operations of blocks 560-590. In block 560, the PCF can locally store the identifiers of the one or more UE-supported OS retrieved from the UDR (e.g., in 542*a*). In block 570, the PCF can subsequently receive, from the SMF, a request for updated policy rules for the PDU session, wherein the request includes an updated network application identifier. In block 580, the PCF can determine one or more updated UE application descriptors based on the updated network application identifier and the locally stored identifiers. In block 590, the PCF can send, to the SMF, updated policy rules including the updated UE application identifiers.

In certain embodiments, the UE application descriptions (e.g., included in the policy rules sent in block 550) can exclude (e.g., not contain) respective versions of the identified UE-supported OS and respective versions of the identified applications.

Figure 6:
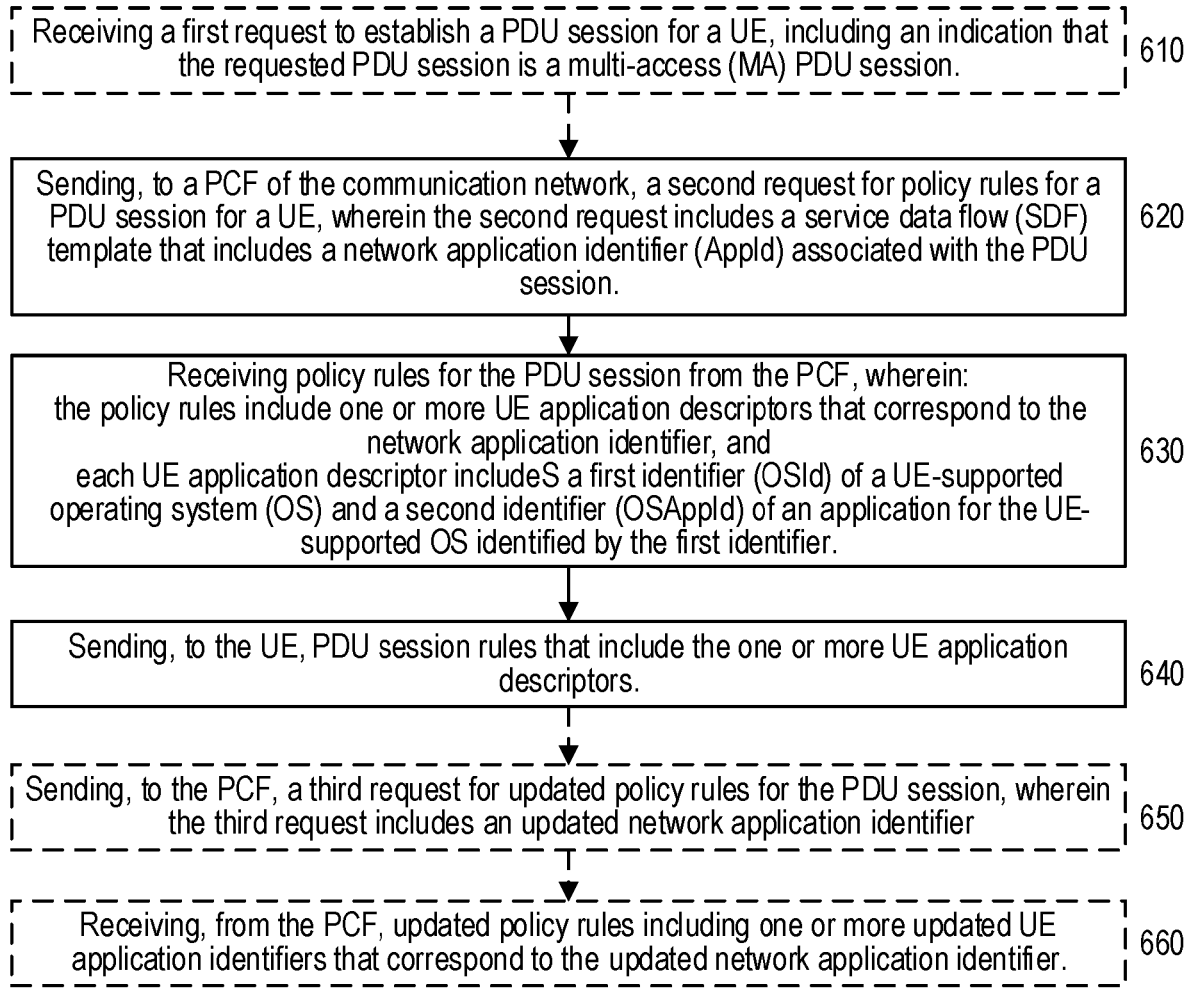
FIG. 6 illustrates an exemplary method (e.g., procedure) for a session management function (SMF) of a communication network (e.g., 5GC, EPC), according to various exemplary embodiments of the present disclosure.

In addition, FIG. 6 illustrates an exemplary method (e.g., procedure) for a session management function (SMF) for a communication network (e.g., 5GC), according to various exemplary embodiments of the present disclosure. The SMF can be hosted and/or provided by one or more network nodes in or associated with the communication network, such as described elsewhere herein.

The exemplary method can include the operations of blocks 620-640. In block 620, the SMF can send, to a PCF of the communication network, a second request for policy rules for a PDU session for a UE. The second request includes a service data flow (SDF) template that includes a network application identifier (AppId) associated with the PDU session. In block 630, the PCF can receive policy rules for the PDU session from the PCF. The policy rules can include one or more UE application descriptors that correspond to the network application identifier. Each UE application descriptor includes a first identifier (OSId) of a UE-supported operating system (OS) and a second identifier (OSAppId) of an application for the UE-supported OS identified by the first identifier. In block 640, the SMF can send, to the UE, PDU session rules that include the one or more UE application descriptors. In some embodiments, the PDU session rules are for Access Traffic Steering, Switching, and Splitting (ATSSS).

In some embodiments the UE application descriptions (e.g., included in the policy rules received in block 630) can exclude (e.g., not contain) respective versions of the identified UE-supported OS and respective versions of the identified applications.

In some embodiments, the exemplary method can also include the operations of block 610, where the SMF can receive a first request to establish the PDU session for the UE. The first request includes an indication that the requested PDU session is a multi-access (MA) PDU session. In such embodiments, the second request (e.g., sent in block 620) includes an indication that the policy rules are for a MA PDU session.

In some embodiments, the exemplary method can also include the operations of blocks 650-660. In block 650, the SMF can send, to the PCF, a third request for updated policy rules for the PDU session, wherein the third request includes an updated network application identifier. In block 660, the SMF can receive, from the PCF, updated policy rules including one or more updated UE application identifiers that correspond to the updated network application identifier.

Figure 7:
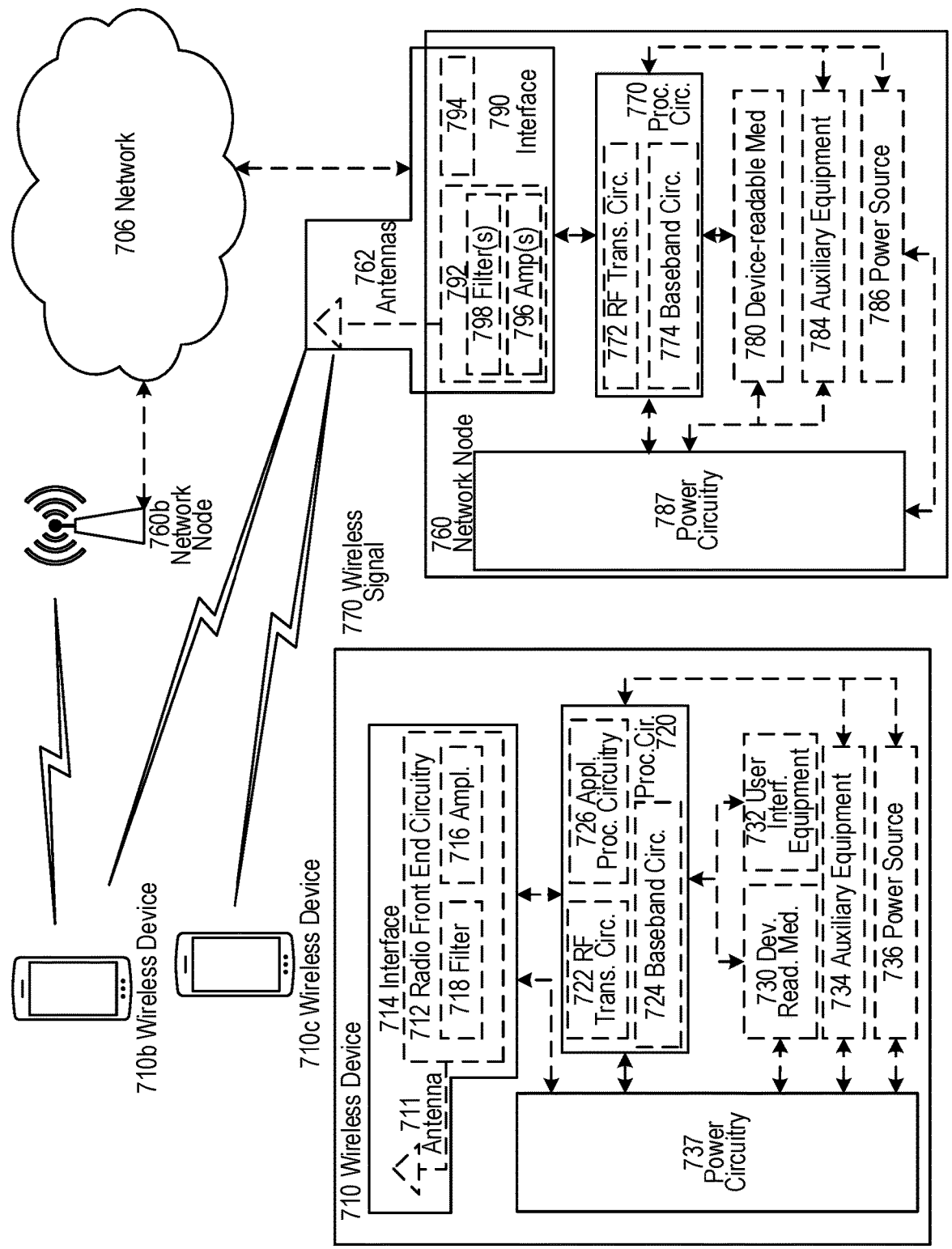
FIG. 7 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760*b*, and wireless devices (WDs) 710 710, 710*b*, and 710*c*. In practice, a wireless network can further include any additional elements suitable to support communication between wireless devices or between a wireless device and another communication device, such as a landline telephone, a service provider, or any other network node or end device. Of the illustrated components, network node 760 and WD 710 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs, S-GW, M-GW, etc.), core network functions (e.g., PCEF, PCRF, AMF, UPF, NEF, SMF, PCF, etc.), application functions (AF) associated with the core network, O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) or function capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 760 are depicted as single boxes located within a larger box, or nested within multiple boxes, in practice, a network node can comprise multiple different physical components that make up a single illustrated component (e.g., device readable medium 780 can comprise multiple separate hard drives as well as multiple RAM modules).

Similarly, network node 760 can be composed of multiple physically separate components (e.g., a NodeB component and an RNC component, or a BTS component and a BSC component, etc.), which can each have their own respective components. In certain scenarios in which network node 760 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 760 can be configured to support multiple radio access technologies (RATs). In such embodiments, some components can be duplicated (e.g., separate device readable medium 780 for the different RATs) and some components can be reused (e.g., the same antenna 762 can be shared by the RATs). Network node 760 can also include multiple sets of the various illustrated components for different wireless technologies integrated into network node 760, such as, for example, GSM, WCDMA, LTE, NR, WiFi, or Bluetooth wireless technologies. These wireless technologies can be integrated into the same or different chip or set of chips and other components within network node 760.

Processing circuitry 770 can be configured to perform any determining, calculating, or similar operations (e.g., certain obtaining operations) described herein as being provided by a network node. These operations performed by processing circuitry 770 can include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 760, either alone or in conjunction with other network node 760 components (e.g., device readable medium 780). Such functionality can include any of the various wireless features, functions, or benefits discussed herein.

For example, processing circuitry 770 can execute instructions stored in device readable medium 780 or in memory within processing circuitry 770. In some embodiments, processing circuitry 770 can include a system on a chip (SOC). As a more specific example, instructions (also referred to as a computer program product) stored in medium 780 can include instructions that, when executed by processing circuitry 770, can configure network node 760 to perform operations corresponding to various exemplary methods (e.g., procedures) described herein.

In some embodiments, processing circuitry 770 can include one or more of radio frequency (RF) transceiver circuitry 772 and baseband processing circuitry 774. In some embodiments, radio frequency (RF) transceiver circuitry 772 and baseband processing circuitry 774 can be on separate chips (or sets of chips), boards, or units, such as radio units and digital units. In alternative embodiments, part or all of RF transceiver circuitry 772 and baseband processing circuitry 774 can be on the same chip or set of chips, boards, or units In certain embodiments, some or all of the functionality described herein as being provided by a network node, base station, eNB or other such network device can be performed by processing circuitry 770 executing instructions stored on device readable medium 780 or memory within processing circuitry 770. In alternative embodiments, some or all of the functionality can be provided by processing circuitry 770 without executing instructions stored on a separate or discrete device readable medium, such as in a hard-wired manner In any of those embodiments, whether executing instructions stored on a device readable storage medium or not, processing circuitry 770 can be configured to perform the described functionality. The benefits provided by such functionality are not limited to processing circuitry 770 alone or to other components of network node 760 but are enjoyed by network node 760 as a whole, and/or by end users and the wireless network generally.

Device readable medium 780 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 770. Device readable medium 780 can store any suitable instructions, data or information, including a computer program, software, an application including one or more of logic, rules, code, tables, etc. and/or other instructions capable of being executed by processing circuitry 770 and, utilized by network node 760. Device readable medium 780 can be used to store any calculations made by processing circuitry 770 and/or any data received via interface 790. In some embodiments, processing circuitry 770 and device readable medium 780 can be considered to be integrated.

Interface 790 is used in the wired or wireless communication of signaling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that can be coupled to, or in certain embodiments a part of, antenna 762. Radio front end circuitry 792 comprises filters 798 and amplifiers 796. Radio front end circuitry 792 can be connected to antenna 762 and processing circuitry 770. Radio front end circuitry can be configured to condition signals communicated between antenna 762 and processing circuitry 770. Radio front end circuitry 792 can receive digital data that is to be sent out to other network nodes or WDs via a wireless connection. Radio front end circuitry 792 can convert the digital data into a radio signal having the appropriate channel and bandwidth parameters using a combination of filters 798 and/or amplifiers 796. The radio signal can then be transmitted via antenna 762. Similarly, when receiving data, antenna 762 can collect radio signals which are then converted into digital data by radio front end circuitry 792. The digital data can be passed to processing circuitry 770. In other embodiments, the interface can comprise different components and/or different combinations of components.

In certain alternative embodiments, network node 760 may not include separate radio front end circuitry 792, instead, processing circuitry 770 can comprise radio front end circuitry and can be connected to antenna 762 without separate radio front end circuitry 792. Similarly, in some embodiments, all or some of RF transceiver circuitry 772 can be considered a part of interface 790. In still other embodiments, interface 790 can include one or more ports or terminals 794, radio front end circuitry 792, and RF transceiver circuitry 772, as part of a radio unit (not shown), and interface 790 can communicate with baseband processing circuitry 774, which is part of a digital unit (not shown).

Antenna 762 can include one or more antennas, or antenna arrays, configured to send and/or receive wireless signals. Antenna 762 can be coupled to radio front end circuitry 790 and can be any type of antenna capable of transmitting and receiving data and/or signals wirelessly. In some embodiments, antenna 762 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 762 can be separate from network node 760 and can be connectable to network node 760 through an interface or port.

Antenna 762, interface 790, and/or processing circuitry 770 can be configured to perform any receiving operations and/or certain obtaining operations described herein as being performed by a network node. Any information, data and/or signals can be received from a wireless device, another network node and/or any other network equipment. Similarly, antenna 762, interface 790, and/or processing circuitry 770 can be configured to perform any transmitting operations described herein as being performed by a network node. Any information, data and/or signals can be transmitted to a wireless device, another network node and/or any other network equipment.

Power circuitry 787 can comprise, or be coupled to, power management circuitry and can be configured to supply the components of network node 760 with power for performing the functionality described herein. Power circuitry 787 can receive power from power source 786. Power source 786 and/or power circuitry 787 can be configured to provide power to the various components of network node 760 in a form suitable for the respective components (e.g., at a voltage and current level needed for each respective component). Power source 786 can either be included in, or external to, power circuitry 787 and/or network node 760. For example, network node 760 can be connectable to an external power source (e.g., an electricity outlet) via an input circuitry or interface such as an electrical cable, whereby the external power source supplies power to power circuitry 787. As a further example, power source 786 can comprise a source of power in the form of a battery or battery pack which is connected to, or integrated in, power circuitry 787. The battery can provide backup power should the external power source fail. Other types of power sources, such as photovoltaic devices, can also be used.

Alternative embodiments of network node 760 can include additional components beyond those shown in FIG. 7 that can be responsible for providing certain aspects of the network node's functionality, including any of the functionality described herein and/or any functionality necessary to support the subject matter described herein. For example, network node 760 can include user interface equipment to allow and/or facilitate input of information into network node 760 and to allow and/or facilitate output of information from network node 760. This can allow and/or facilitate a user to perform diagnostic, maintenance, repair, and other administrative functions for network node 760.

Furthermore, various network functions (NFs, e.g., SMF, PCF, UDR, AMF, etc.) described herein can be implemented with and/or hosted by different variants of network node 760, including variants described above.

In some embodiments, a wireless device (WD, e.g., WD 710) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, WD 710 includes antenna 711, interface 714, processing circuitry 720, device readable medium 730, user interface equipment 732, auxiliary equipment 734, power source 736 and power circuitry 737. WD 710 can include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies can be integrated into the same or different chips or set of chips as other components within WD 710.

Antenna 711 can include one or more antennas or antenna arrays, configured to send and/or receive wireless signals, and is connected to interface 714. In certain alternative embodiments, antenna 711 can be separate from WD 710 and be connectable to WD 710 through an interface or port. Antenna 711, interface 714, and/or processing circuitry 720 can be configured to perform any receiving or transmitting operations described herein as being performed by a WD. Any information, data and/or signals can be received from a network node and/or another WD. In some embodiments, radio front end circuitry and/or antenna 711 can be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720 and can be configured to condition signals communicated between antenna 711 and processing circuitry 720. Radio front end circuitry 712 can be coupled to or a part of antenna 711. In some embodiments, WD 710 may not include separate radio front end circuitry 712; rather, processing circuitry 720 can comprise radio front end circuitry and can be connected to antenna 711. Similarly, in some embodiments, some or all of RF transceiver circuitry 722 can be considered a part of interface 714. Radio front end circuitry 712 can receive digital data that is to be sent out to other network nodes or WDs via a wireless connection. Radio front end circuitry 712 can convert the digital data into a radio signal having the appropriate channel and bandwidth parameters using a combination of filters 718 and/or amplifiers 716. The radio signal can then be transmitted via antenna 711. Similarly, when receiving data, antenna 711 can collect radio signals which are then converted into digital data by radio front end circuitry 712. The digital data can be passed to processing circuitry 720. In other embodiments, the interface can comprise different components and/or different combinations of components.

Processing circuitry 720 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 710 functionality either alone or in combination with other WD 710 components, such as device readable medium 730. Such functionality can include any of the various wireless features or benefits discussed herein.

For example, processing circuitry 720 can execute instructions stored in device readable medium 730 or in memory within processing circuitry 720 to provide the functionality disclosed herein. More specifically, instructions (also referred to as a computer program product) stored in medium 730 can include instructions that, when executed by processing circuitry 720, can configure WD 710 to perform operations corresponding to various exemplary methods (e.g., procedures) described herein.

As illustrated, processing circuitry 720 includes one or more of RF transceiver circuitry 722, baseband processing circuitry 724, and application processing circuitry 726. In other embodiments, the processing circuitry can comprise different components and/or different combinations of components. In certain embodiments processing circuitry 720 of WD 710 can comprise a SOC. In some embodiments, RF transceiver circuitry 722, baseband processing circuitry 724, and application processing circuitry 726 can be on separate chips or sets of chips. In alternative embodiments, part or all of baseband processing circuitry 724 and application processing circuitry 726 can be combined into one chip or set of chips, and RF transceiver circuitry 722 can be on a separate chip or set of chips. In still alternative embodiments, part or all of RF transceiver circuitry 722 and baseband processing circuitry 724 can be on the same chip or set of chips, and application processing circuitry 726 can be on a separate chip or set of chips. In yet other alternative embodiments, part or all of RF transceiver circuitry 722, baseband processing circuitry 724, and application processing circuitry 726 can be combined in the same chip or set of chips. In some embodiments, RF transceiver circuitry 722 can be a part of interface 714. RF transceiver circuitry 722 can condition RF signals for processing circuitry 720.

In certain embodiments, some or all of the functionality described herein as being performed by a WD can be provided by processing circuitry 720 executing instructions stored on device readable medium 730, which in certain embodiments can be a computer-readable storage medium. In alternative embodiments, some or all of the functionality can be provided by processing circuitry 720 without executing instructions stored on a separate or discrete device readable storage medium, such as in a hard-wired manner In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 can be configured to perform any determining, calculating, or similar operations (e.g., certain obtaining operations) described herein as being performed by a WD. These operations, as performed by processing circuitry 720, can include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 can be operable to store a computer program, software, an application including one or more of logic, rules, code, tables, etc. and/or other instructions capable of being executed by processing circuitry 720. Device readable medium 730 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 720. In some embodiments, processing circuitry 720 and device readable medium 730 can be considered to be integrated.

User interface equipment 732 can include components that allow and/or facilitate a human user to interact with WD 710. Such interaction can be of many forms, such as visual, audial, tactile, etc. User interface equipment 732 can be operable to produce output to the user and to allow and/or facilitate the user to provide input to WD 710. The type of interaction can vary depending on the type of user interface equipment 732 installed in WD 710. For example, if WD 710 is a smart phone, the interaction can be via a touch screen; if WD 710 is a smart meter, the interaction can be through a screen that provides usage (e.g., the number of gallons used) or a speaker that provides an audible alert (e.g., if smoke is detected). User interface equipment 732 can include input interfaces, devices and circuits, and output interfaces, devices and circuits. User interface equipment 732 can be configured to allow and/or facilitate input of information into WD 710 and is connected to processing circuitry 720 to allow and/or facilitate processing circuitry 720 to process the input information. User interface equipment 732 can include, for example, a microphone, a proximity or other sensor, keys/buttons, a touch display, one or more cameras, a USB port, or other input circuitry. User interface equipment 732 is also configured to allow and/or facilitate output of information from WD 710, and to allow and/or facilitate processing circuitry 720 to output information from WD 710. User interface equipment 732 can include, for example, a speaker, a display, vibrating circuitry, a USB port, a headphone interface, or other output circuitry. Using one or more input and output interfaces, devices, and circuits, of user interface equipment 732, WD 710 can communicate with end users and/or the wireless network and allow and/or facilitate them to benefit from the functionality described herein.

Auxiliary equipment 734 is operable to provide more specific functionality which may not be generally performed by WDs. This can comprise specialized sensors for doing measurements for various purposes, interfaces for additional types of communication such as wired communications etc. The inclusion and type of components of auxiliary equipment 734 can vary depending on the embodiment and/or scenario.

Power source 736 can, in some embodiments, be in the form of a battery or battery pack. Other types of power sources, such as an external power source (e.g., an electricity outlet), photovoltaic devices or power cells, can also be used. WD 710 can further comprise power circuitry 737 for delivering power from power source 736 to the various parts of WD 710 which need power from power source 736 to carry out any functionality described or indicated herein.

Power circuitry 737 can in certain embodiments comprise power management circuitry. Power circuitry 737 can additionally or alternatively be operable to receive power from an external power source; in which case WD 710 can be connectable to the external power source (such as an electricity outlet) via input circuitry or an interface such as an electrical power cable. Power circuitry 737 can also in certain embodiments be operable to deliver power from an external power source to power source 736. This can be, for example, for the charging of power source 736. Power circuitry 737 can perform any converting or other modification to the power from power source 736 to make it suitable for supply to the respective components of WD 710.

Figure 8:
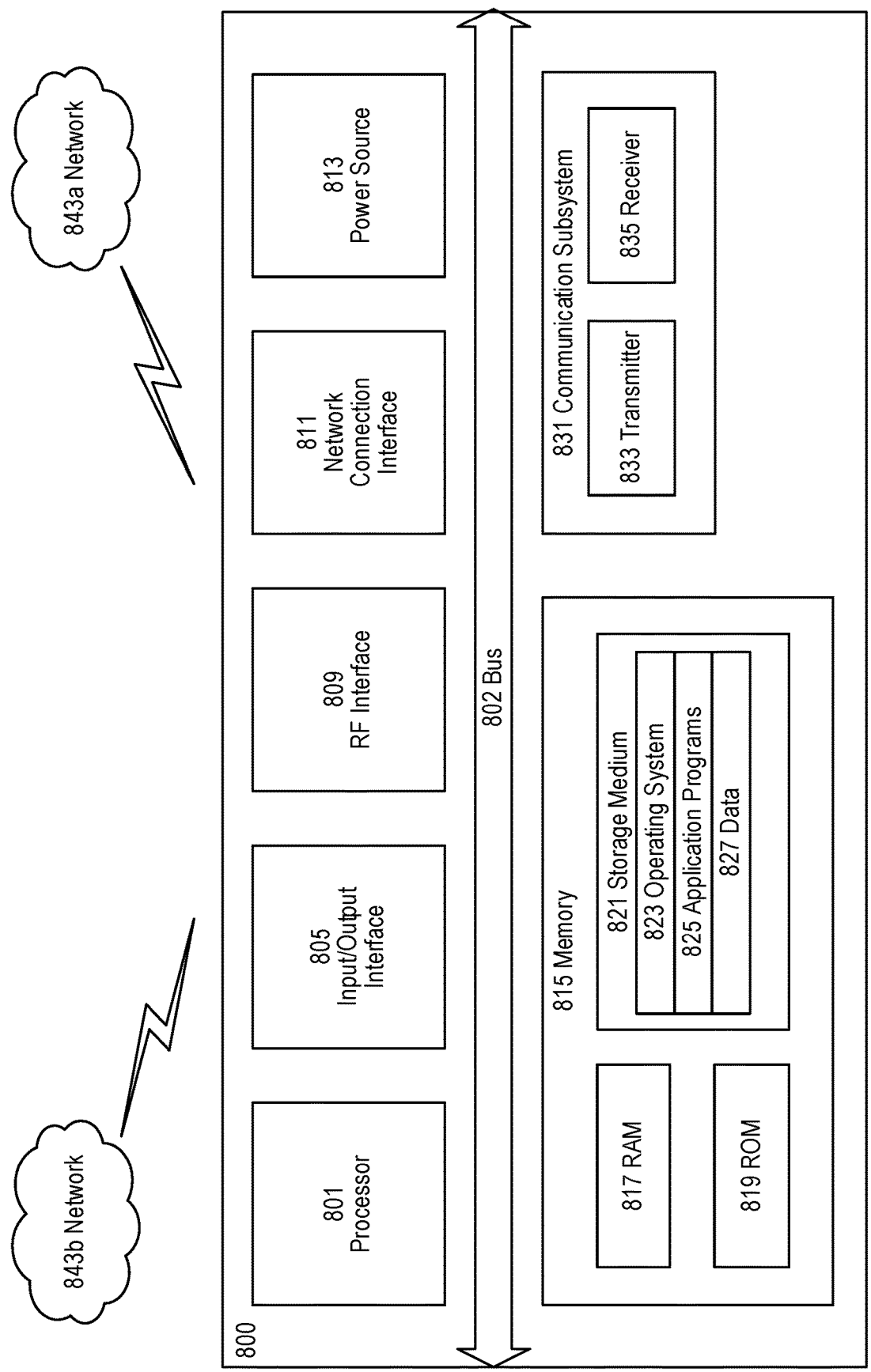
FIG. 8 illustrates an exemplary embodiment of a UE, according to various exemplary embodiments of the present disclosure.

FIG. 8 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 800 can be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 can include other similar types of information. Certain UEs can utilize all of the components shown in FIG. 8, or only a subset of the components. The level of integration between the components can vary from one UE to another UE. Further, certain UEs can contain multiple instances of a component, such as multiple processors, memories, transceivers, transmitters, receivers, etc.

In FIG. 8, processing circuitry 801 can be configured to process computer instructions and data. Processing circuitry 801 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 can include two central processing units (CPUs). Data can be information in a form suitable for use by a computer.

In the depicted embodiment, input/output interface 805 can be configured to provide a communication interface to an input device, output device, or input and output device. UE 800 can be configured to use an output device via input/output interface 805. An output device can use the same type of interface port as an input device. For example, a USB port can be used to provide input to and output from UE 800. The output device can be a speaker, a sound card, a video card, a display, a monitor, a printer, an actuator, an emitter, a smartcard, another output device, or any combination thereof. UE 800 can be configured to use an input device via input/output interface 805 to allow and/or facilitate a user to capture information into UE 800. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 8, RF interface 809 can be configured to provide a communication interface to RF components such as a transmitter, a receiver, and an antenna. Network connection interface 811 can be configured to provide a communication interface to network 843a. Network 843a can encompass wired and/or wireless networks such as a local-area network (LAN), a wide-area network (WAN), a computer network, a wireless network, a telecommunications network, another like network or any combination thereof. For example, network 843a can comprise a Wi-Fi network. Network connection interface 811 can be configured to include a receiver and a transmitter interface used to communicate with one or more other devices over a communication network according to one or more communication protocols, such as Ethernet, TCP/IP, SONET, ATM, or the like. Network connection interface 811 can implement receiver and transmitter functionality appropriate to the communication network links (e.g., optical, electrical, and the like). The transmitter and receiver functions can share circuit components, software or firmware, or alternatively can be implemented separately.

RAM 817 can be configured to interface via bus 802 to processing circuitry 801 to provide storage or caching of data or computer instructions during the execution of software programs such as the operating system, application programs, and device drivers. ROM 819 can be configured to provide computer instructions or data to processing circuitry 801. For example, ROM 819 can be configured to store invariant low-level system code or data for basic system functions such as basic input and output (I/O), startup, or reception of keystrokes from a keyboard that are stored in a non-volatile memory. Storage medium 821 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 821 can be configured to include operating system 823; application program 825 such as a web browser application, a widget or gadget engine or another application; and data file 827. Storage medium 821 can store, for use by UE 800, any of a variety of various operating systems or combinations of operating systems. For example, application program 825 can include executable program instructions (also referred to as a computer program product) that, when executed by processor 801, can configure UE 800 to perform operations corresponding to various exemplary methods (e.g., procedures) described herein.

Storage medium 821 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 can allow and/or facilitate UE 800 to access computer-executable instructions, application programs or the like, stored on transitory or non-transitory memory media, to off-load data, or to upload data. An article of manufacture, such as one utilizing a communication system can be tangibly embodied in storage medium 821, which can comprise a device readable medium.

In FIG. 8, processing circuitry 801 can be configured to communicate with network 843b using communication subsystem 831. Network 843a and network 843b can be the same network or networks or different network or networks. Communication subsystem 831 can be configured to include one or more transceivers used to communicate with network 843b. For example, communication subsystem 831 can be configured to include one or more transceivers used to communicate with one or more remote transceivers of another device capable of wireless communication such as another WD, UE, or base station of a radio access network (RAN) according to one or more communication protocols, such as IEEE 802.8, CDMA, WCDMA, GSM, LTE, UTRAN, WiMax, or the like. Each transceiver can include transmitter 833 and/or receiver 835 to implement transmitter or receiver functionality, respectively, appropriate to the RAN links (e.g., frequency allocations and the like). Further, transmitter 833 and receiver 835 of each transceiver can share circuit components, software or firmware, or alternatively can be implemented separately.

In the illustrated embodiment, the communication functions of communication subsystem 831 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 can include cellular communication, Wi-Fi communication, Bluetooth communication, and GPS communication. Network 843b can encompass wired and/or wireless networks such as a local-area network (LAN), a wide-area network (WAN), a computer network, a wireless network, a telecommunications network, another like network or any combination thereof. For example, network 843b can be a cellular network, a Wi-Fi network, and/or a near-field network. Power source 813 can be configured to provide alternating current (AC) or direct current (DC) power to components of UE 800.

The features, benefits and/or functions described herein can be implemented in one of the components of UE 800 or partitioned across multiple components of UE 800. Further, the features, benefits, and/or functions described herein can be implemented in any combination of hardware, software or firmware. In one example, communication subsystem 831 can be configured to include any of the components described herein. Further, processing circuitry 801 can be configured to communicate with any of such components over bus 802. In another example, any of such components can be represented by program instructions stored in memory that when executed by processing circuitry 801 perform the corresponding functions described herein. In another example, the functionality of any of such components can be partitioned between processing circuitry 801 and communication subsystem 831. In another example, the non-computationally intensive functions of any of such components can be implemented in software or firmware and the computationally intensive functions can be implemented in hardware.

Figure 9:
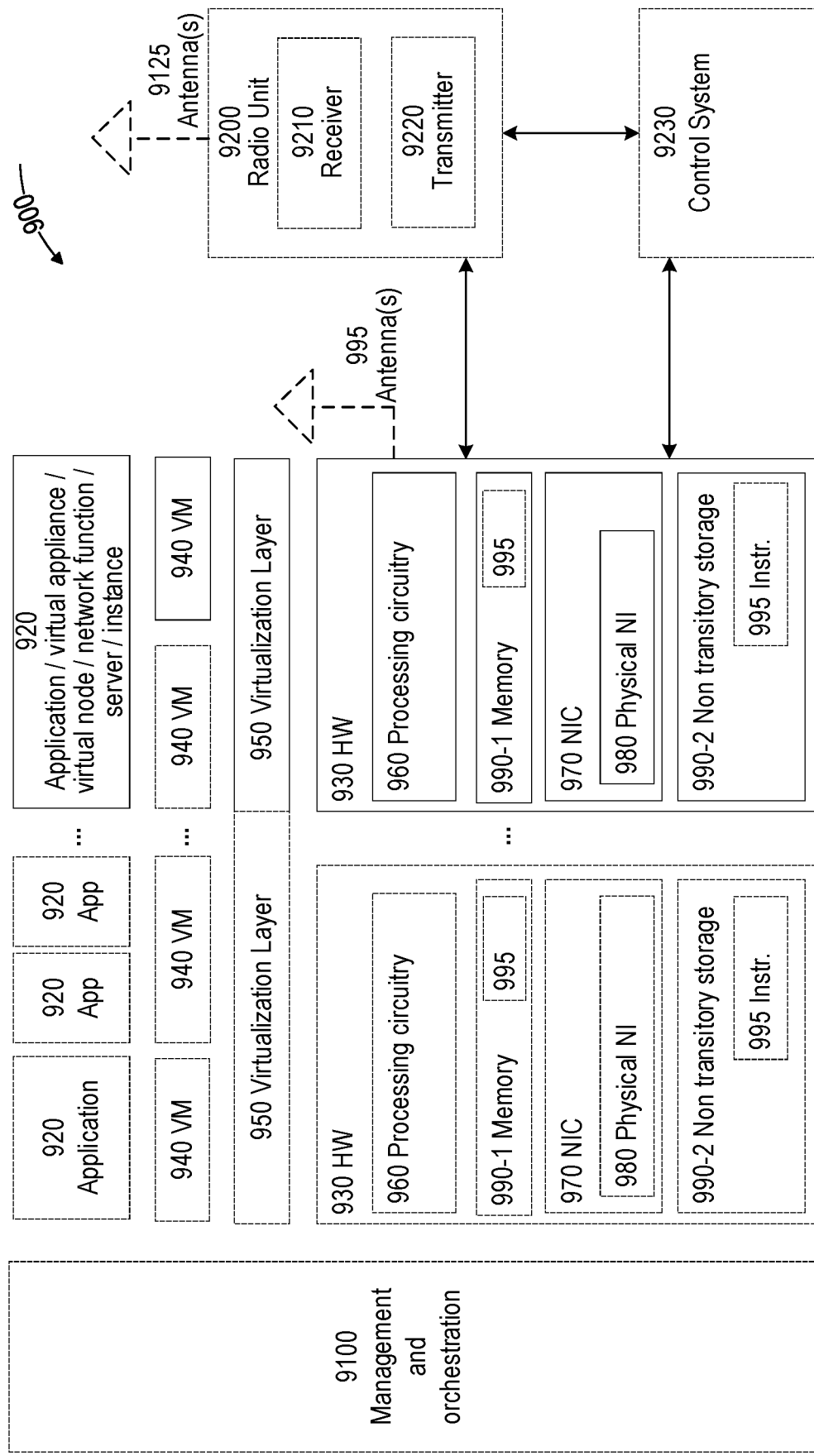
FIG. 9 is a block diagram illustrating an exemplary virtualization environment usable for implementation of various embodiments described herein.

FIG. 9 is a schematic block diagram illustrating a virtualization environment 900 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node can be entirely virtualized.

The functions can be implemented by one or more applications 920 (which can alternatively be called software instances, virtual appliances, network functions, application functions, virtual nodes, virtual network functions, etc.) operative to implement some of the features, functions, and/or benefits of some of the embodiments disclosed herein. Applications 920 (including, e.g., network functions and/or application functions) are run in virtualization environment 900 which provides hardware 930 comprising processing circuitry 960 and memory 990. Memory 990 contains instructions 9125 executable by processing circuitry 960 whereby application 920 is operative to provide one or more of the features, benefits, and/or functions disclosed herein.

Virtualization environment 900 can include general-purpose or special-purpose network hardware devices (or nodes) 930 comprising a set of one or more processors or processing circuitry 960, which can be commercial off-the-shelf (COTS) processors, dedicated Application Specific Integrated Circuits (ASICs), or any other type of processing circuitry including digital or analog hardware components or special purpose processors. Each hardware device can comprise memory 990-1 which can be non-persistent memory for temporarily storing instructions 9125 or software executed by processing circuitry 960. For example, instructions 9125 can include program instructions (also referred to as a computer program product) that, when executed by processing circuitry 960, can configure hardware node 920 to perform operations corresponding to various exemplary methods (e.g., procedures) described herein. Such operations can also be attributed to virtual node(s) 920 that is/are hosted by hardware node 930.

Each hardware device can comprise one or more network interface controllers (NICs) 970, also known as network interface cards, which include physical network interface 980. Each hardware device can also include non-transitory, persistent, machine-readable storage media 990-2 having stored therein software 9125 and/or instructions executable by processing circuitry 960. Software 9125 can include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and can be run by a corresponding virtualization layer 950 or hypervisor. Different embodiments of the instance of virtual appliance 920 can be implemented on one or more of virtual machines 940, and the implementations can be made in different ways.

During operation, processing circuitry 960 executes software 9125 to instantiate the hypervisor or virtualization layer 950, which can sometimes be referred to as a virtual machine monitor (VMM). Virtualization layer 950 can present a virtual operating platform that appears like networking hardware to virtual machine 940.

As shown in FIG. 9, hardware 930 can be a standalone network node with generic or specific components. Hardware 930 can comprise antenna 9225 and can implement some functions via virtualization. Alternatively, hardware 930 can be part of a larger cluster of hardware (e.g., such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 940 can be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 can be coupled to one or more antennas 9225. Radio units 9200 can communicate directly with hardware nodes 930 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 9230, which can alternatively be used for communication between the hardware nodes 930 and radio units 9200.

Various network functions (NFs, e.g., SMF, PCF, UDR, AMF, etc.) described herein can be implemented in virtualization environment 900, e.g., as NFs 920 running on hardware 930.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art. Example embodiments of the techniques and apparatus described herein include, but are not limited to, the following enumerated examples:

E1. A method for a policy control function (PCF) of a communication network, the method comprising:
  during registration of a user equipment (UE) in the communication network, determining one or more first identifiers of respective one or more operating systems (OS) supported by the UE;
  storing the first identifiers in a user data repository (UDR) of the communication network;
  during establishment of a PDU session for the UE, and based on an application identifier in a service data flow (SDF) template associated with the PDU session, determining one or more second identifiers of OS that are associated with the application identifier and supported by the UE; and
  sending, to a session management function (SMF) of the communication network, policy rules for the PDU session, wherein the policy rules include the second identifiers and one or more third identifiers that correspond to the respective second identifiers and that are associated with the application identifier.

E2. The method of embodiment E1, further comprising receiving, from the SMF, a request for the policy rules for the PDU session, wherein:
  the request includes the SDF template that includes the application identifier; and
  the policy rules are sent in response to the request.

E2a. The method of embodiment E2, wherein the request also includes an indication that the requested policy rules are for a multi-access (MA) PDU session.

E3. The method of any of embodiments E1-E2a, wherein the third identifiers are further application identifiers, each further identifier associated with a particular one of the second identifiers of the OS supported by the UE.

E4. The method of any of embodiments E1-E3, wherein determining the second identifiers comprises retrieving the first identifiers from the UDR, wherein the second identifiers are included in the first identifiers.

E5. The method of embodiment E4, wherein determining the second identifiers further comprises, when the first identifiers are unavailable from the UDR:
  determining the second identifiers based on an identifier of the UE; and
  when the second identifiers cannot be determined based on the identifier of the UE, determining the second identifiers based on a predetermined relationship between the application identifier and OS identifiers.

E6. A method for a session management function (SMF) of a communication network, the method comprising:
  receiving a first request to establish a PDU session for a user equipment (UE);
  sending, to a policy control function (PCF) of the communication network, a second request for policy rules for the PDU session, wherein the second request includes a service data flow (SDF) template that includes an application identifier associated with the PDU session;
  receiving, from the PCF, policy rules for the PDU session, wherein the policy rules include:
    one or more second identifiers of operating systems (OS) that are associated with the application identifier and supported by the UE, and
    one or more third identifiers that correspond to the respective second identifiers and that are associated with the application identifier; and
  sending, to the UE, PDU session rules that include the second and third identifiers.

E7. The method of embodiment E1, further comprising, wherein:
  the first request includes an indication that the requested PDU session a multi-access (MA) PDU session; and
  the second request includes an indication that the policy rules are for a MA PDU session.

E8. The method of any of embodiments E1-E2, wherein the third identifiers are further application identifiers, each further identifier associated with a particular one of the second identifiers of the OS supported by the UE.

E9. The method of any of embodiments E6-E8, wherein the PDU session rules are for Access Traffic Steering, Switching, and Splitting (ATSSS).

E10. A policy control function (PCF) for a communication network, the PCF comprising:
  interface circuitry configured to communicate with at least a session management function (SMF) and a user data repository (UDR) of the communication network; and
  processing circuitry operably coupled to the interface circuitry, whereby the processing circuitry and interface circuitry are configured to perform operations corresponding to any of the methods of embodiments E1-E5.

E11. A policy control function (PCF) for a communication network, the PCF being arranged to perform operations corresponding to any of the methods of embodiments E1-E5.

E12. A non-transitory, computer-readable medium storing computer-executable instructions that, when executed by processing circuitry associated with a policy control function (PCF) for a communication network, configure the PCF to perform operations corresponding to any of the methods of embodiments E1-E5.

E13. A computer program product comprising computer-executable instructions that, when executed by processing circuitry associated with a policy control function (PCF) for a communication network, configure the PCF to perform operations corresponding to any of the methods of embodiments E1-E5.

E14. A session management function (SMF) for a communication network, the SMF comprising:
  interface circuitry configured to communicate with at least a user equipment (UE) and a policy control function (PCF) of the communication network; and
  processing circuitry operably coupled to the interface circuitry, whereby the processing circuitry and interface circuitry are configured to perform operations corresponding to any of the methods of embodiments E6-E9.

E15. A session management function (SMF) for a communication network, the SMF being arranged to perform operations corresponding to any of the methods of embodiments E6-E9.

E16. A non-transitory, computer-readable medium storing computer-executable instructions that, when executed by processing circuitry associated with a session management function (SMF) for a communication network, configure the SMF to perform operations corresponding to any of the methods of embodiments E6-E9.

E17. A computer program product comprising computer-executable instructions that, when executed by processing circuitry associated with a session management function (SMF) for a communication network, configure the SMF to perform operations corresponding to any of the methods of embodiments E6-E9.

The invention claimed is:

1. A method for a policy control function (PCF) of a communication network, the method comprising:
  during establishment of a packet data unit (PDU) session for a user equipment (UE), determining one or more UE application descriptors that correspond to a network application identifier, AppId, of a service data flow (SDF) template for the PDU session, wherein each UE application descriptor includes:
    a first identifier, OSId, of a UE-supported operating system (OS), and
    a second identifier, OSAppId, of an application for the UE-supported OS identified by the first identifier;
  receiving a request for policy rules for the PDU session from a session management function (SMF) of the communication network, wherein the request includes the SDF template which includes the network application identifier, AppID; and
  in response to the request, sending the policy rules for the PDU session to the SMF, wherein the policy rules sent to the SMF include the UE application descriptors that correspond to the network application identifier, AppID.

2. The method of claim 1, wherein:
  the request also includes an indication that the requested policy rules are for a multi-access (MA) PDU session; and
  the policy rules include Access Traffic Steering, Switching, and Splitting (ATSSS) information.

3. The method of claim 1, further comprising:
  determining identifiers of one or more UE-supported OS during registration of the UE in the communication network; and
  storing the determined identifiers in a user data repository (UDR) of the communication network.

4. The method of claim 3, wherein determining the identifiers of one or more UE-supported OS during registration of the UE includes one of the following:
  receiving the identifiers from the UE; or
  deriving the identifiers based on a permanent equipment identifier (PEI) of the UE, that was obtained from an access and mobility management function (AMF) of the communication network.

5. The method of claim 1, wherein determining one or more UE application descriptors comprises:
  mapping the network application identifier to one or more OS identifiers and corresponding one or more OS-specific application identifiers;
  obtaining identifiers of one or more UE-supported OS;
  selecting, as the first identifiers, the mapped OS identifiers that match the obtained identifiers of UE-supported OS; and
  selecting, as the second identifiers, the mapped OS-specific application identifiers that correspond to the selected first identifiers.

6. The method of claim 5, wherein obtaining identifiers of one or more UE-supported OS comprises:
  querying a user data repository (UDR) of the communication network for identifiers of UE-supported OS;
  when identifiers of UE-supported OS are unavailable from the UDR, determining the identifiers of UE-supported OS based on a permanent equipment identifier (PEI) of the UE obtained from the SMF; and
  when identifiers of UE-supported OS cannot be determined based on the PEI, selecting identifiers of OS that are commonly supported by UEs operating in the communication network.

7. The method of claim 6, further comprising:
  locally storing the identifiers of the one or more UE-supported OS retrieved from the UDR;
  subsequently receiving, from the SMF, a request for updated policy rules for the PDU session, wherein the request includes an updated network application identifier;
  determining one or more updated UE application descriptors based on the updated network application identifier and the locally stored identifiers; and
  sending, to the SMF, updated policy rules including the updated UE application identifiers.

8. The method of claim 1, wherein the UE application descriptors exclude the following information:
  respective versions of the identified UE-supported OS; and
  respective versions of the identified applications.

9. A method for a session management function (SMF) of a communication network, the method comprising:
  sending, to a policy control function (PCF) of the communication network, a second request for policy rules for a packet data unit (PDU) session for a user equipment (UE), wherein the second request includes a service data flow (SDF) template that includes a network application identifier, AppId, associated with the PDU session;
  receiving policy rules for the PDU session from the PCF, wherein:
    the policy rules include one or more UE application descriptors that correspond to the network application identifier, AppID; and
    each UE application descriptor includes:
      a first identifier, OSId, of a UE-supported operating system (OS), and
      a second identifier, OSAppId, of an application for the UE-supported OS identified by the first identifier; and sending, to the UE, PDU session rules that include the one or more UE application descriptors.

10. The method of claim 9, further comprising receiving a first request to establish the PDU session for the UE, wherein:
the first request includes an indication that the requested PDU session is a multi-access (MA) PDU session; and
the second request is based on the first request and includes an indication that the policy rules are for a MA PDU session.

11. The method of claim 9, wherein the PDU session rules are for Access Traffic Steering, Switching, and Splitting (ATSSS).

12. The method of claim 9, further comprising:
sending, to the PCF, a third request for updated policy rules for the PDU session, wherein the third request includes an updated network application identifier; and
receiving, from the PCF, updated policy rules including one or more updated UE application identifiers that correspond to the updated network application identifier.

13. The method of claim 9, wherein the UE application descriptors exclude the following information:
respective versions of the identified UE-supported OS; and
respective versions of the identified applications.

14. A policy control function (PCF) of a communication network, the PCF comprising:
interface circuitry configured to communicate with at least a session management function (SMF) and a user data repository (UDR) of the communication network; and
processing circuitry operably coupled to the interface circuitry, whereby the processing circuitry and interface circuitry are configured to:
during establishment of a packet data unit (PDU) session for a user equipment (UE), determine one or more UE application descriptors that correspond to a network application identifier, AppId, of a service data flow (SDF) template for the PDU session, wherein each UE application descriptor includes:
a first identifier, OSId, of a UE-supported operating system (OS), and
a second identifier, OSAppId, of an application for the UE-supported OS identified by the first identifier;
receive a request for policy rules for the PDU session from the SMF, wherein the request includes the SDF template which includes the network application identifier, AppID; and
in response to the request, send the policy rules for the PDU session to the SMF, wherein the policy rules sent to the SMF include the UE application descriptors that correspond to the network application identifier, AppID.

15. The PCF of claim 14, wherein the processing circuitry and the interface circuitry are configured to determine one or more UE application descriptors based on:
mapping the network application identifier to one or more OS identifiers and corresponding one or more OS-specific application identifiers;
obtaining identifiers of one or more UE-supported OS;
selecting, as the first identifiers, the mapped OS identifiers that match the obtained identifiers of UE-supported OS; and
selecting, as the second identifiers, the mapped OS-specific application identifiers that correspond to the selected first identifiers.

16. A non-transitory, computer-readable medium storing computer-executable instructions that, when executed by processing circuitry associated with a policy control function (PCF) of a communication network, configure the PCF to perform operations corresponding to the method of claim 1.

17. A session management function (SMF) of a communication network, the SMF comprising:
interface circuitry configured to communicate with at least a user equipment (UE) and a policy control function (PCF) of the communication network; and
processing circuitry operably coupled to the interface circuitry, whereby the processing circuitry and interface circuitry are configured to:
send, to the PCF, a second request for policy rules for a packet data unit (PDU) session for a user equipment (UE), wherein the second request includes a service data flow (SDF) template that includes a network application identifier, AppId, associated with the PDU session;
receive policy rules for the PDU session from the PCF, wherein:
the policy rules include one or more UE application descriptors that correspond to the network application identifier, AppID; and
each UE application descriptor includes:
a first identifier, OSId, of a UE-supported operating system (OS), and
a second identifier, OSAppId, of an application for the UE-supported OS identified by the first identifier; and
send, to the UE, PDU session rules that include the one or more UE application descriptors.

18. The SMF of claim 17, wherein the processing circuitry and interface circuitry are further configured to receive a first request to establish the PDU session for the UE, wherein:
the first request includes an indication that the requested PDU session is a multi-access (MA) PDU session; and
the second request is based on the first request and includes an indication that the policy rules are for a MA PDU session.

19. A non-transitory, computer-readable medium storing computer-executable instructions that, when executed by processing circuitry associated with a session management function (SMF) of a communication network, configure the SMF to perform operations corresponding to the method of claim 9.

* * * * *